US011410233B2

(12) United States Patent
Creighton, IV et al.

(10) Patent No.: US 11,410,233 B2
(45) Date of Patent: Aug. 9, 2022

(54) BLOCKCHAIN TECHNOLOGY TO SETTLE TRANSACTIONS

(71) Applicant: Domus Tower, Inc., San Francisco, CA (US)

(72) Inventors: John Everett Creighton, IV, San Francisco, CA (US); Joseph Burke Forster, San Francisco, CA (US)

(73) Assignee: Domus Tower, Inc., San Francisco, CA (US)

( * ) Notice: Subject to any disclaimer, the term of this patent is extended or adjusted under 35 U.S.C. 154(b) by 599 days.

(21) Appl. No.: 15/467,727

(22) Filed: Mar. 23, 2017

(65) Prior Publication Data

US 2017/0228822 A1  Aug. 10, 2017

Related U.S. Application Data

(63) Continuation of application No. 14/838,290, filed on Aug. 27, 2015, now abandoned, and a continuation of application No. 15/078,768, filed on Mar. 23, 2016, now Pat. No. 10,515,409.

(60) Provisional application No. 62/312,376, filed on Mar. 23, 2016.

(51) Int. Cl.
*G06Q 40/04* (2012.01)
*G06Q 20/38* (2012.01)

(52) U.S. Cl.
CPC ......... *G06Q 40/04* (2013.01); *G06Q 20/3829* (2013.01)

(58) Field of Classification Search
CPC ........ G06Q 40/04; G06Q 20/36; G06Q 20/06; G06Q 20/065; G06Q 20/3674; G06Q 20/3678; G06Q 20/382; G06Q 20/3829; G06Q 20/401; G06Q 2220/00; G06Q 40/06; H04L 67/104
USPC .......................................... 705/37
See application file for complete search history.

(56) References Cited

U.S. PATENT DOCUMENTS

| | | | | |
|---|---|---|---|---|
| 5,671,358 A | * | 9/1997 | Debe | G06Q 40/04 705/1.1 |
| 5,677,955 A | * | 10/1997 | Doggett | G06Q 20/02 235/379 |
| 5,748,738 A | | 5/1998 | Bisbee et al. | |
| 5,758,097 A | * | 5/1998 | Debe | G06Q 40/00 705/12 |
| 5,774,553 A | * | 6/1998 | Rosen | G06Q 20/02 235/379 |

(Continued)

OTHER PUBLICATIONS

Apache Storm [online]. Apache Software Foundation, 2014, pp. 1-2 [retrieved on Sep. 1, 2018]. Retrieved from the Internet: <URL: https://storm.apache.org/>.

(Continued)

*Primary Examiner* — Slade E Smith
(74) *Attorney, Agent, or Firm* — Perkins Coie LLP; Brian Coleman; Lena Petrovic

(57) ABSTRACT

Expediting settlement of securities traded on an exchange is described. A clearing instruction representing an order for equities can be received. The clearing instruction can include a cryptographic signature. A data block within a blockchain can be generated to include the order and the cryptographic signature. If the cryptographic signature is determined to be valid, a fast track settlement process can be selected to process the order.

18 Claims, 21 Drawing Sheets

(56) References Cited

U.S. PATENT DOCUMENTS

| | | | | |
|---|---|---|---|---|
| 5,839,119 A * | 11/1998 | Krsul | ................ | G06Q 30/0601 705/39 |
| 5,978,779 A | 11/1999 | Stein et al. | | |
| 6,029,146 A * | 2/2000 | Hawkins | ................ | G06Q 40/00 235/379 |
| 6,237,096 B1 | 5/2001 | Bisbee et al. | | |
| 6,247,000 B1 | 6/2001 | Hawkins et al. | | |
| 6,321,212 B1 * | 11/2001 | Lange | ................ | G06Q 40/00 705/35 |
| 6,434,238 B1 * | 8/2002 | Chaum | ................ | G06Q 20/341 380/30 |
| 7,127,421 B1 * | 10/2006 | Beacham | ................ | G06Q 10/00 705/35 |
| 7,444,300 B1 | 10/2008 | Broms et al. | | |
| 7,567,909 B1 * | 7/2009 | Billingsley | ............ | G06Q 20/02 705/317 |
| 9,672,499 B2 | 6/2017 | Yang et al. | | |
| 9,892,460 B1 | 2/2018 | Winklevoss et al. | | |
| 10,068,228 B1 | 9/2018 | Winklevoss et al. | | |
| 10,269,009 B1 | 4/2019 | Winklevoss et al. | | |
| 2002/0032642 A1 * | 3/2002 | Chichilnisky | .......... | G06Q 40/04 705/37 |
| 2002/0035531 A1 * | 3/2002 | Push | ................ | G06Q 40/06 705/36 R |
| 2002/0128929 A1 * | 9/2002 | Urabe | ................ | G06Q 20/10 705/26.35 |
| 2002/0133383 A1 * | 9/2002 | Chao | ................ | G06Q 10/0633 705/4 |
| 2002/0156726 A1 * | 10/2002 | Kleckner | ................ | G06Q 20/10 705/39 |
| 2002/0174066 A1 * | 11/2002 | Kleckner | ................ | G06Q 20/04 705/39 |
| 2003/0130958 A1 * | 7/2003 | Narayanan | .......... | H04L 63/0823 705/73 |
| 2003/0158798 A1 | 8/2003 | Green | | |
| 2003/0220869 A1 * | 11/2003 | Colle | ................ | G06Q 40/04 705/37 |
| 2004/0083159 A1 * | 4/2004 | Crosby | ................ | G06Q 40/02 705/37 |
| 2004/0128223 A1 * | 7/2004 | Kuhn | ................ | G06Q 40/04 705/37 |
| 2005/0010613 A1 | 1/2005 | Lejdstrom et al. | | |
| 2005/0102220 A1 | 5/2005 | Stackpole | | |
| 2005/0171892 A1 | 8/2005 | Naas et al. | | |
| 2005/0192888 A1 | 9/2005 | Lennane et al. | | |
| 2005/0283422 A1 * | 12/2005 | Myr | ................ | G06Q 20/381 705/37 |
| 2006/0059066 A1 | 3/2006 | Glinberg et al. | | |
| 2006/0069066 A1 | 3/2006 | Eldar-finkelman et al. | | |
| 2006/0106708 A1 | 5/2006 | Abushaban et al. | | |
| 2006/0186193 A1 | 8/2006 | Nelson et al. | | |
| 2006/0224494 A1 * | 10/2006 | Pinkava | ................ | G06Q 40/04 705/37 |
| 2007/0198376 A1 | 8/2007 | Zhu et al. | | |
| 2007/0233615 A1 * | 10/2007 | Tumminaro | .......... | G06Q 20/322 705/75 |
| 2007/0250426 A1 | 10/2007 | Demirjian | | |
| 2007/0250437 A1 | 10/2007 | Lejdstrom et al. | | |
| 2007/0282734 A1 * | 12/2007 | Huntley | ................ | G06Q 40/04 705/37 |
| 2007/0294183 A1 * | 12/2007 | Camenisch | ............ | G06Q 20/06 705/65 |
| 2008/0052215 A1 | 2/2008 | Tudisco | | |
| 2008/0281750 A1 | 11/2008 | Toffey et al. | | |
| 2009/0043637 A1 | 2/2009 | Eder | | |
| 2009/0055250 A1 | 2/2009 | Skuriat et al. | | |
| 2009/0070268 A1 | 3/2009 | Sarkissian et al. | | |
| 2009/0119190 A1 * | 5/2009 | Realini | ................ | G06Q 20/04 705/30 |
| 2009/0157501 A1 * | 6/2009 | Martel | ................ | G06Q 40/12 705/14.36 |
| 2009/0164386 A1 | 6/2009 | Greenfield et al. | | |
| 2009/0177591 A1 | 7/2009 | Thorpe et al. | | |
| 2009/0240616 A1 | 9/2009 | Hammer et al. | | |
| 2010/0005022 A1 | 1/2010 | Depetris et al. | | |
| 2010/0005030 A1 | 1/2010 | Depetris et al. | | |
| 2010/0185531 A1 | 7/2010 | Van Luchene | | |
| 2011/0071958 A1 | 3/2011 | Grody et al. | | |
| 2011/0145789 A1 | 6/2011 | Rasch et al. | | |
| 2012/0078772 A1 | 3/2012 | Booth | | |
| 2012/0185373 A1 | 7/2012 | Grody | | |
| 2012/0284155 A1 | 11/2012 | Holten et al. | | |
| 2012/0296792 A1 * | 11/2012 | Levoff | ................ | G06Q 40/04 705/37 |
| 2013/0030963 A1 | 1/2013 | Cramer et al. | | |
| 2013/0073436 A1 | 3/2013 | Luk et al. | | |
| 2013/0073520 A1 | 3/2013 | Ng et al. | | |
| 2013/0218739 A1 | 8/2013 | Kmiec et al. | | |
| 2013/0226827 A1 * | 8/2013 | Stevens | ................ | G06Q 40/06 705/36 R |
| 2014/0114832 A1 | 4/2014 | Escott | | |
| 2014/0172663 A1 * | 6/2014 | Kronwall | ............... | G06Q 40/06 705/37 |
| 2014/0188675 A1 | 7/2014 | Brown et al. | | |
| 2014/0229351 A1 | 8/2014 | Lutnick et al. | | |
| 2014/0258071 A1 | 9/2014 | Tilly et al. | | |
| 2014/0297504 A1 * | 10/2014 | Bergenudd | ............. | G06Q 40/04 705/37 |
| 2015/0026072 A1 * | 1/2015 | Zhou | ................ | H04W 12/033 705/71 |
| 2015/0066732 A1 | 3/2015 | Escort | | |
| 2015/0074415 A1 | 3/2015 | Tanner et al. | | |
| 2015/0081566 A1 * | 3/2015 | Slepinin | ................ | G06Q 20/3678 705/69 |
| 2015/0106250 A1 * | 4/2015 | Deel-Smith | ............ | G06Q 40/04 705/37 |
| 2015/0106255 A1 | 4/2015 | Labuszewski et al. | | |
| 2015/0120567 A1 * | 4/2015 | Van Rooyen | .......... | G06F 21/10 705/59 |
| 2015/0127515 A1 | 5/2015 | Studnitzer et al. | | |
| 2015/0127516 A1 | 5/2015 | Studnitzer et al. | | |
| 2015/0142670 A1 * | 5/2015 | Zloth | ................ | G06Q 20/3829 705/71 |
| 2015/0161727 A1 | 6/2015 | Callaway et al. | | |
| 2015/0206106 A1 * | 7/2015 | Yago | ................ | G06Q 20/0655 705/68 |
| 2015/0220928 A1 | 8/2015 | Allen | | |
| 2015/0244690 A1 * | 8/2015 | Mossbarger | ............ | H04L 9/006 713/171 |
| 2015/0254272 A1 | 9/2015 | Regni et al. | | |
| 2015/0262137 A1 | 9/2015 | Armstrong | | |
| 2015/0262176 A1 | 9/2015 | Langschaedel et al. | | |
| 2015/0269675 A1 * | 9/2015 | Walker | ................ | G06Q 40/04 705/37 |
| 2015/0278820 A1 * | 10/2015 | Meadows | .......... | G06Q 20/3821 705/64 |
| 2015/0286645 A1 | 10/2015 | Sinha et al. | | |
| 2015/0287026 A1 | 10/2015 | Yang et al. | | |
| 2015/0332224 A1 | 11/2015 | Melika et al. | | |
| 2015/0332395 A1 * | 11/2015 | Walker | ................ | G06Q 20/065 705/69 |
| 2015/0356555 A1 * | 12/2015 | Pennanen | ............ | G06Q 20/382 705/71 |
| 2016/0042468 A1 | 2/2016 | Shaaban et al. | | |
| 2016/0077920 A1 | 3/2016 | Regni et al. | | |
| 2016/0086267 A1 | 3/2016 | Labuszewski et al. | | |
| 2016/0086268 A1 | 3/2016 | Labuszewski et al. | | |
| 2016/0092984 A1 | 3/2016 | Shontz et al. | | |
| 2016/0092985 A1 | 3/2016 | Shontz et al. | | |
| 2016/0092988 A1 | 3/2016 | Letourneau | | |
| 2016/0162897 A1 | 6/2016 | Feeney | | |
| 2016/0246802 A1 | 8/2016 | Regni et al. | | |
| 2016/0260169 A1 * | 9/2016 | Arnold | ................ | G06Q 20/381 |
| 2016/0269182 A1 * | 9/2016 | Sriram | ................ | H04L 9/3242 |
| 2016/0283941 A1 * | 9/2016 | Andrade | ............ | G06Q 20/4014 |
| 2016/0292786 A1 | 10/2016 | Khizhnyak et al. | | |
| 2016/0300223 A1 | 10/2016 | Grey et al. | | |
| 2016/0321751 A1 | 11/2016 | Creighton, IV et al. | | |
| 2017/0178237 A1 | 6/2017 | Wong | | |
| 2017/0228705 A1 | 8/2017 | Sandor et al. | | |
| 2017/0278081 A1 * | 9/2017 | Walker | ................ | G06Q 20/36 |

(56) References Cited

U.S. PATENT DOCUMENTS

2017/0300812 A1* 10/2017 Ohsawa .................. G06N 3/08
2017/0300912 A1* 10/2017 Narasimhan ....... G06Q 20/3827
2017/0338967 A1* 11/2017 Lewison ................ H04L 9/321
2018/0240107 A1* 8/2018 Andrade ................ G06Q 20/36
2018/0341930 A1* 11/2018 Moir ................. G06Q 20/3825

OTHER PUBLICATIONS

Hyperledger / Hyperledger-Server [online]. GibHub, Inc. 2015, pp. 1-3 [retrieved on Sep. 1, 2018]. Retrieved from the Internet: <URL: https://github.com/hyperledger/hyperledger-server>.
Nakamoto, Satoshi, "Bitcoin: A Peer-to-Peer Electronic Cash System", satoshin@gmx.com; www.bitcoin.org; Oct. 31, 2008, 9 pages.

* cited by examiner

BLOCKCHAIN TECHNOLOGY TO SETTLE TRANSACTIONS

PRIORITY

This application claims priority to U.S. Provisional Patent Application No. 62/312,376, entitled "Blockchain Technology to Settle US Equities," by Creighton et al., and filed on Mar. 23, 2016. This application also claims priority to and is a continuation of U.S. patent application Ser. No. 14/838, 290, entitled "Real-Time Settlement of Securities Trades Over Append-Only Ledgers," by Creighton et al., and filed on Aug. 27, 2015. This application also claims priority to and is a continuation of U.S. patent application Ser. No. 15/078,768, entitled "Distributing Work Load of High-Volume Per Second Transactions Recorded to Append-Only Ledgers," by Creighton et al., and filed on Mar. 23, 2016. The content of the above-identified applications are incorporated herein by reference in their entirety.

TECHNICAL FIELD

Various embodiments concern the clearing and settlement process of exchange-traded securities. More specifically, various embodiments relate to systems and methods that enable fast track gross settlement of executed trades.

BACKGROUND

When securities trades are executed on a major exchange, the security goes through a settlement process whereby the equity (e.g., securities) are delivered, typically in exchange for money, to fulfill a contractual obligation. However, the traditional settlement process is costly, time consuming, and error prone. For example, in the United States, the settlement date for marketable stocks is usually three business days after the trade is executed. But a number of risks can arise during the settlement interval and, in addition to being time-consuming, some trades are ultimately disputed and never settled. These failed transactions are costly to the financial industry.

SUMMARY

Various embodiments described herein hasten the process by which securities are bought, sold, and delivered ("the settlement process") by using cryptographic hashes. That is, various embodiments enable real-time, or near real-time, gross settlement of trades.

Brokers or traders first include cryptographically-signed instructions with their order. The cryptography structure may be based on public and private keys that identify individual brokers and traders. An exchange, which is an organized market for trading securities, commodities, etc., processes the trades and generates a trade report that summarizes the transaction. In some embodiments, clearing instructions are then processed and sent to one or more appropriate clearing brokers. The trade report and cryptographically-signed instructions can be bundled into an append-only, cryptographic, ledger which is an electronic record of the transaction.

An unlimited number of side ledgers, which represent a subset of global trade asset ownership and orders, can be created from a single primary ledger distributed to a plurality of nodes. Each data block in the primary ledger contains a unique cryptographic hash. The hashes can be made available to all authorized parties (e.g., brokers, traders, custodians, exchanges) and can be used to provide an audit of settlement (i.e., a summary of transactions).

Because transactions can be verified by the cryptographic signatures, the period of time traditionally needed by brokers, traders, etc., to review and dispute order information is no longer necessary. A matching (i.e., validated) signature guarantees that a particular broker generated and authorized the trade.

DETAILED DESCRIPTION

Figure 1:
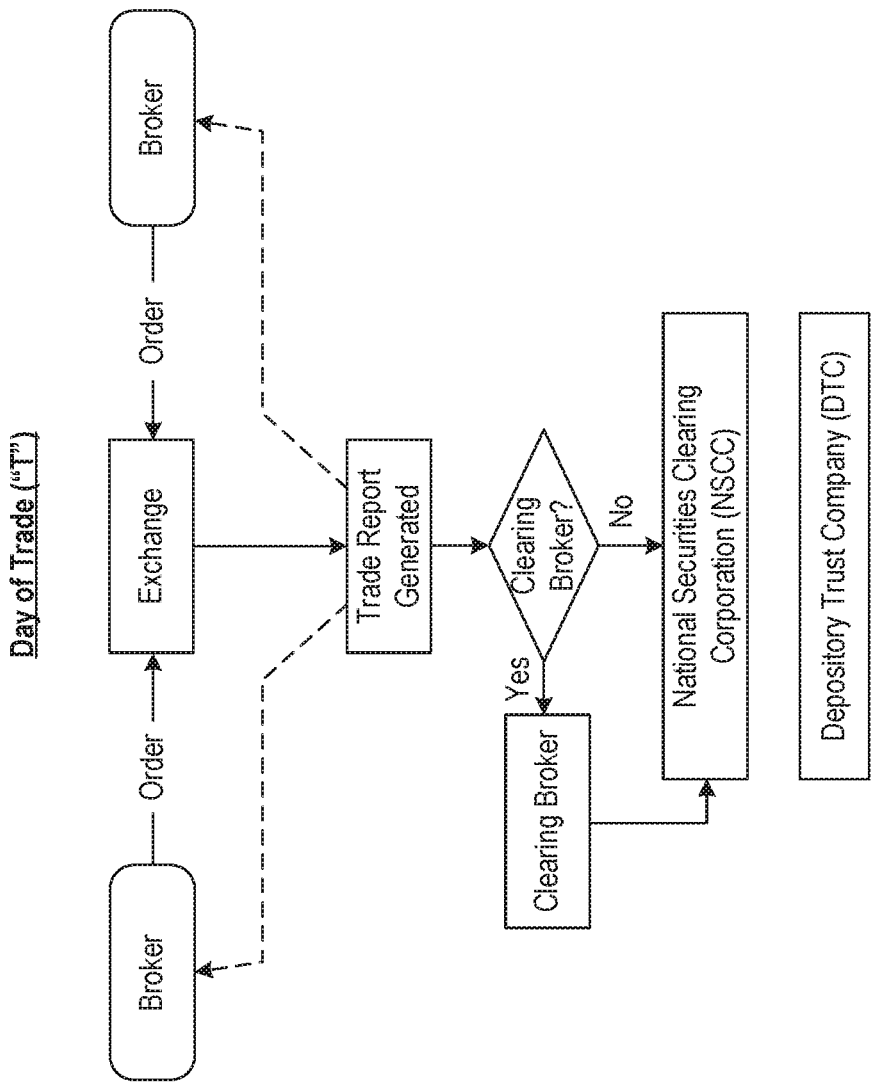
FIG. 1 is an equity exchange and settlement process as may traditionally occur on the trade date ("T").

Traditional trade settlement processes using in by the financial industry can take up to three days to complete, as illustrated by FIGS. 1-4. FIG. 1 illustrates what occurs on the day of the trade (also referred to as "T"). Brokers, also referred to as buyers and sellers (e.g., of equities), can agree to an exchange. For example, brokers may agree to exchange equity (e.g., stock) in a particular company for cash. Once an exchange has been agreed to, a trade report is generated.

In some instances, the trade report is sent to a clearing broker or clearing house that acts as a liaison between the broker(s) and a clearing corporation. The clearing broker ensures the trade is settled appropriately and the transaction is successful. The trade report can then be transmitted by the clearing house to the National Securities Clearing Corporation (NSCC). In some instances, the trade report is sent directly to the NSCC (i.e., no clearing house involved). The NSCC provides clearance, settlement, and information services for the equities. Moreover, the NSCC offers multilateral netting such that brokers can offset buy and sell positions into a single payment obligation.

Figure 2:
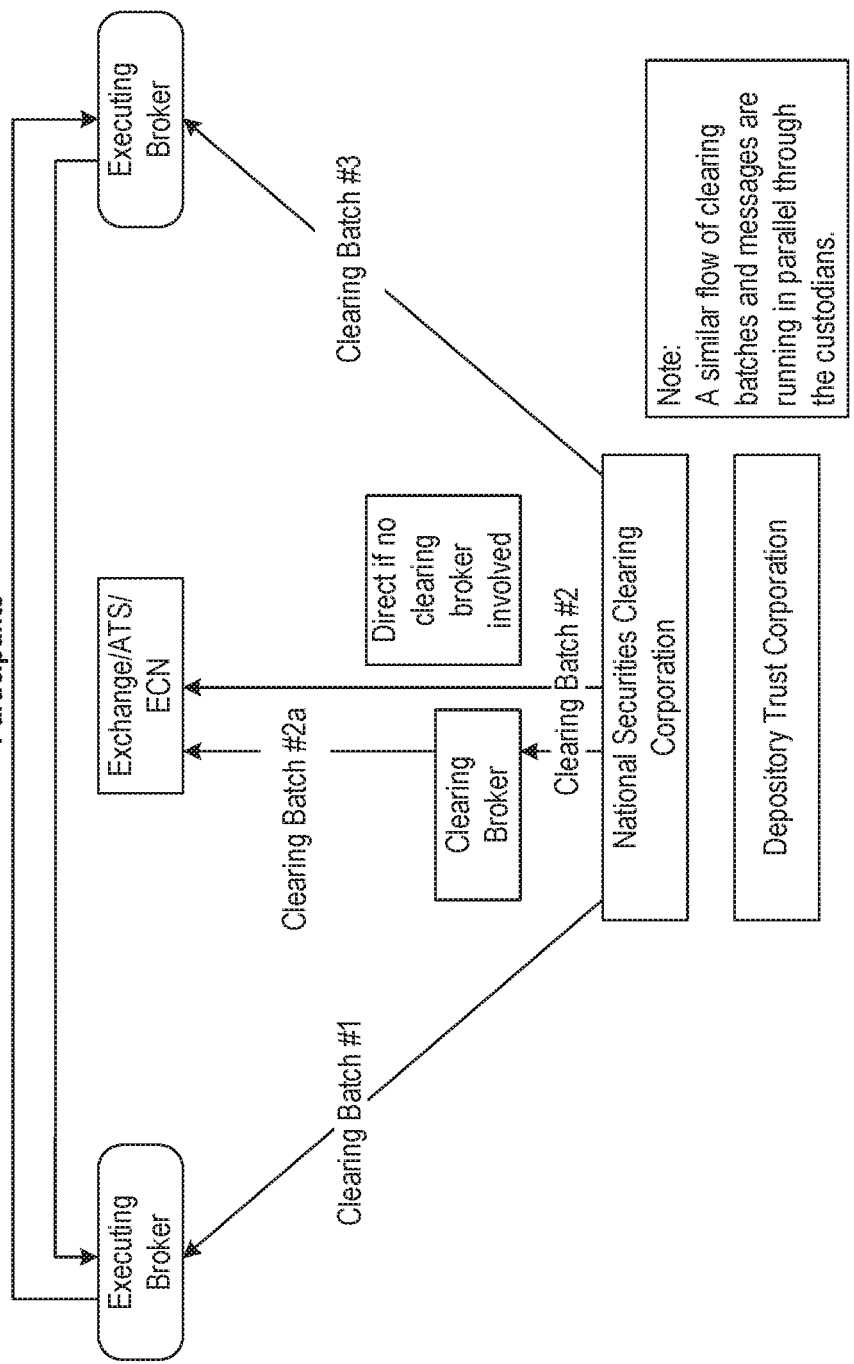
FIG. 2 is an equity exchange and settlement process as may traditionally occur one business day after the trade date ("T+1").

FIG. 2 illustrates what occurs one business day after the day of the trade (also referred to as "T+1"). Here, clearing batches are sent to each of the brokers, who have an opportunity to review and submit a contra report if a particular transaction is unfamiliar. But this often causes a significant delay because brokers are given one business day to review and manually dispute any potential trade.

There are a number of reasons why a broker may dispute a trade. For example, the broker may not know or remember the trade. Such trades are commonly referred to as "DK'd" trades, which indicates the broker "doesn't know" the trade. Part of the reason that DK'd trades happen in industry is that it is difficult to know who was at fault in causing the inaccurate information. Brokers may generate new orders every millisecond, which are matched by the exchange, but the exchange does not have time to check back with the broker to confirm order instructions and still match trades efficiently.

Figure 3:
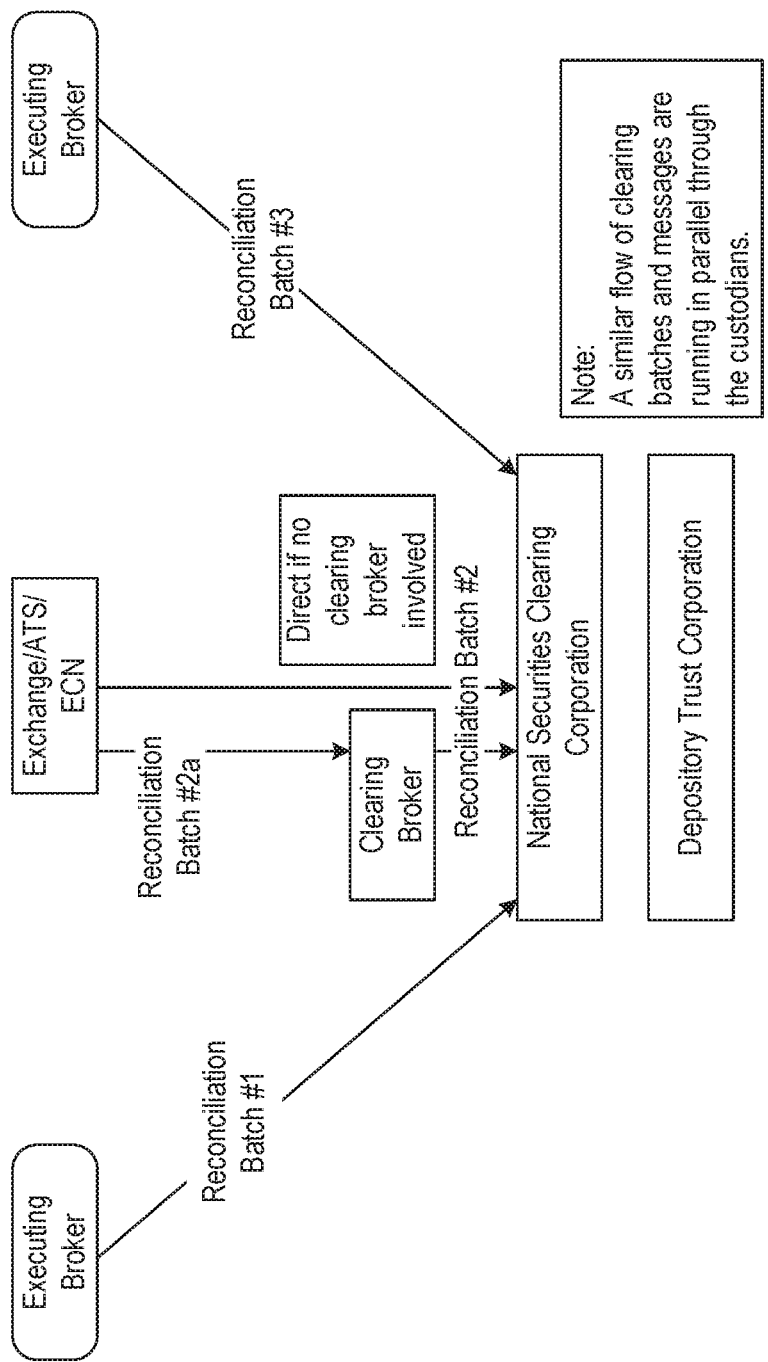
FIG. 3 is an equity exchange and settlement process as may traditionally occur two business days after the trade date ("T+2").
Figure 4:
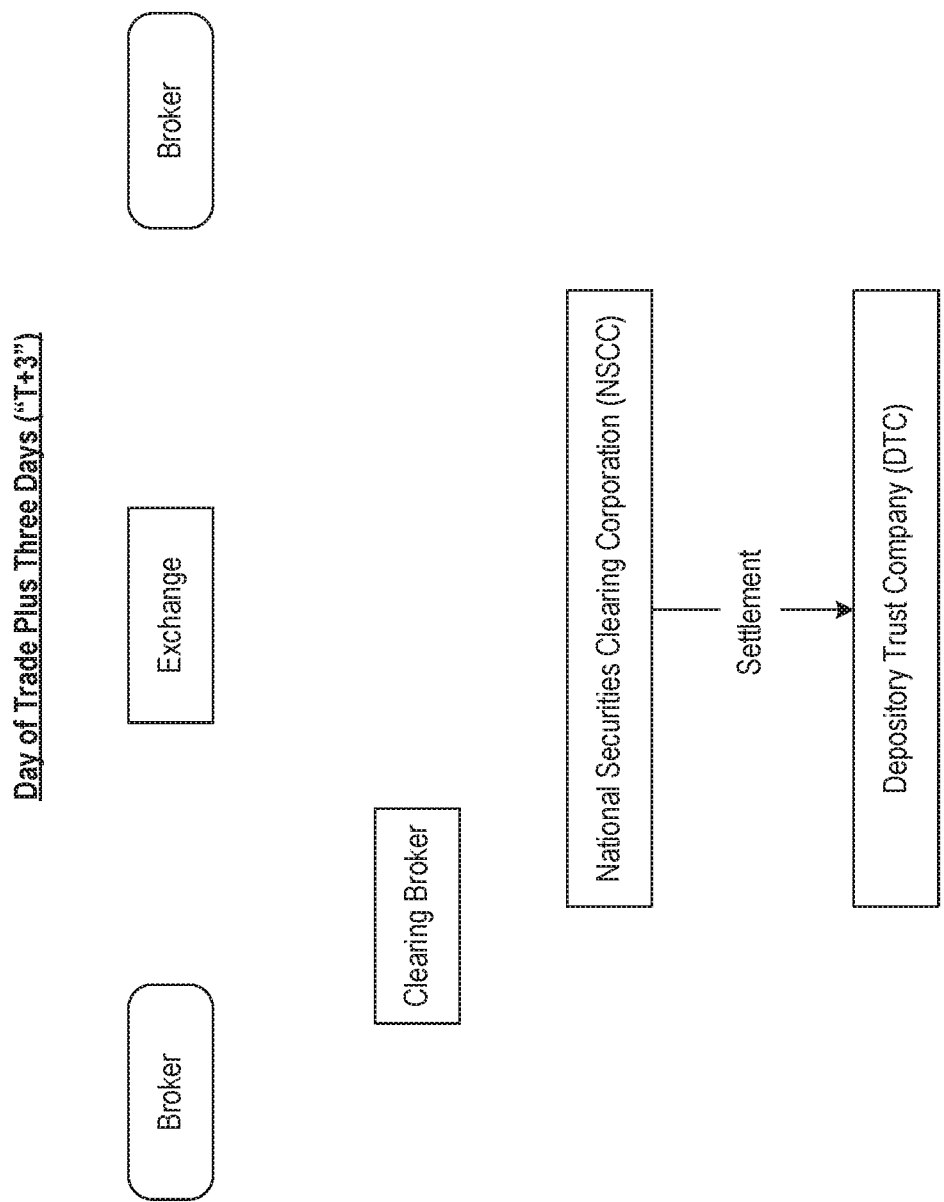
FIG. 4 is an equity exchange and settlement process as may traditionally occur three business days after the trade date ("T+3").

FIG. 3, meanwhile, illustrates what occurs two business days after the day of the trade (also referred to as "T+2"). Reconciliation batches are sent from the exchanges to the NSCC, either directly or through a clearing broker/house. Finally, the NSCC transmits settlement instructions to the Depository Trust Company (DTC) three business days after the trade, as illustrated by FIG. 4.

Terminology

Brief definitions of terms, abbreviations, and phrases used throughout this application are given below.

For purposes of the disclosure, the term "node" refers to a contributor on a distributed network. The node exists on a computer or a server. The physical device is referred to a node in as much as the physical device is programmed to contribute to the network. The word "node" can additionally refer to the programming or software on the physical device that causes the device to know which other devices to communicate with and contribute with the network.

For purposes of the disclosure, the terms "immutable" or "append-only" with reference to ledgers mean that once data has been entered into the ledger, that data is not changed. To repair errors on the ledger new data is added which reverses the erroneous data. Despite that data may not be changed, over time, the ledger may be truncated or archived.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

System Topology Overview

Various embodiments are described herein that enable gross settlement of trades to occur in real-time. More specifically, various embodiments relate to systems and methods for including cryptographically-signed clearing instructions with an order (e.g., to purchase or sell securities) to be carried out by an exchange.

Figure 5:
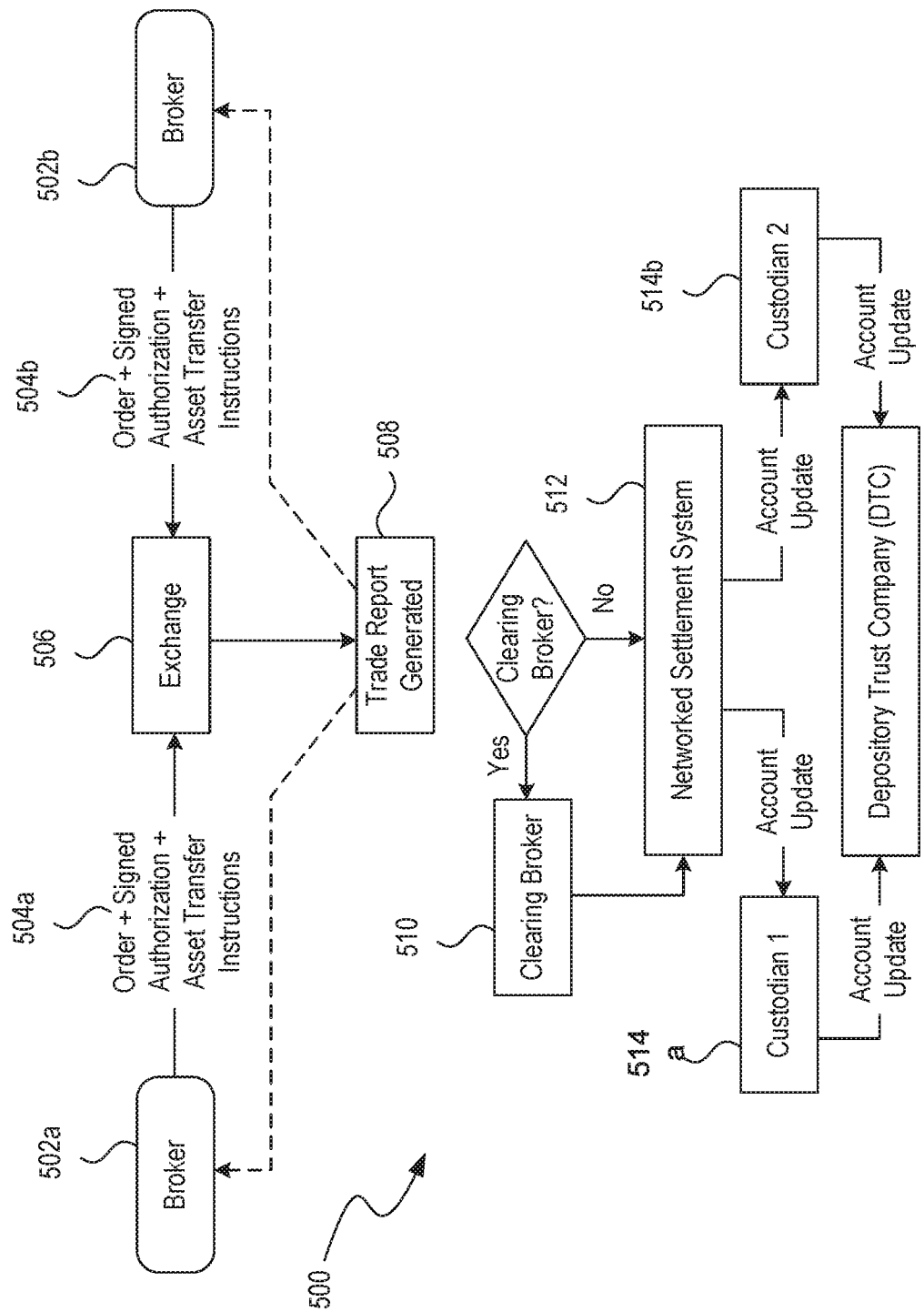
FIG. 5 is a work flow diagram of a straight-through gross-settlement process that occurs in real-time according to various embodiments.

FIG. 5 is a work flow diagram of a straight-through gross-settlement process 500 that occurs in real-time according to various embodiments. A broker 502a-b can include clearing instructions ("Signed Authorization") that are cryptographically-signed with each order 504a-b. The cryptographic signature ensures the broker 502a-b generated an order 504a-b that exactly matches the signature. The order will fail to match the signature even if only a single character is changed. Therefore, only a party with access to a cryptographic private key owned by the broker 502a-b is able to generate a valid (i.e., matching) signature.

After processing the trade, the exchange 506 can generates a trade report 508 for each trade. The clearing instructions are then processed and sent to appropriate clearing brokers 510 or directly to a settlement system 512 for settling trades.

The system 512 can bundle a trade report and signed clearing instructions into a data blocks. Data blocks are inserted into a distributed, append-only ledger. The structure is similar to the "blockchain" used to support Bitcoin transactions; however, there are no "Bitcoin Miners" generating new assets and recording the transactions into blocks. Rather, the distributed, append-only ledger is operated by nodes on a distributed network on computers that both have and do not have complete copies of the primary ledger. Some such nodes store only secondary ledgers to the primary ledger. Using a primary ledger, the system 512 is able to create an unlimited number of side ledgers, or secondary and tertiary ledgers which contain only a subset of the global trade orders.

Cryptography can be used to verify the transactions within the series of ledgers and keep information (e.g., about trades, brokers) private. Each data block recorded on the ledgers contains a unique cryptographic hash. The hashes are available to all authorized parties, thereby allowing brokers and exchanges to review a real-time audit of settlements. Additionally, nodes to the primary ledger may include regulatory agencies.

Consequently, brokers are no longer given an opportunity to dispute order information in a trade once a trade report is generated when using the various embodiments described herein. The process starts with a stream (or several streams) of transactions. Today, some electronic exchanges generate thousands of transactions per second and may peak at a much higher rate closer to a million transactions per second. Transaction volume is likely to increase in the future. In the case of electronic exchanges, a trade report is generated for each transaction.

A matching signature assures that a particular broker generated and authorized specific order instructions, rendering the review period unnecessary. When a trade is "matched" by the system 512, the signed clearing instructions are processed and account updates are sent to appropriate custodians 514a-b.

In addition to signed clearing instructions, each trade can also include signed asset transfer instructions that describe what, exactly, the broker 502a-b would like to trade. For example, a broker 502a-b may wish to sell 100 shares of ABC stock for $1,000 USD. Assuming the broker 502a-b owns more than 100 shares of ABC stock, the broker 502a-b can include instructions that indicate which 100 shares should be sold. In some instances the broker 502a-b may own shares of stock that are held by more than one custodian.

Figure 6:
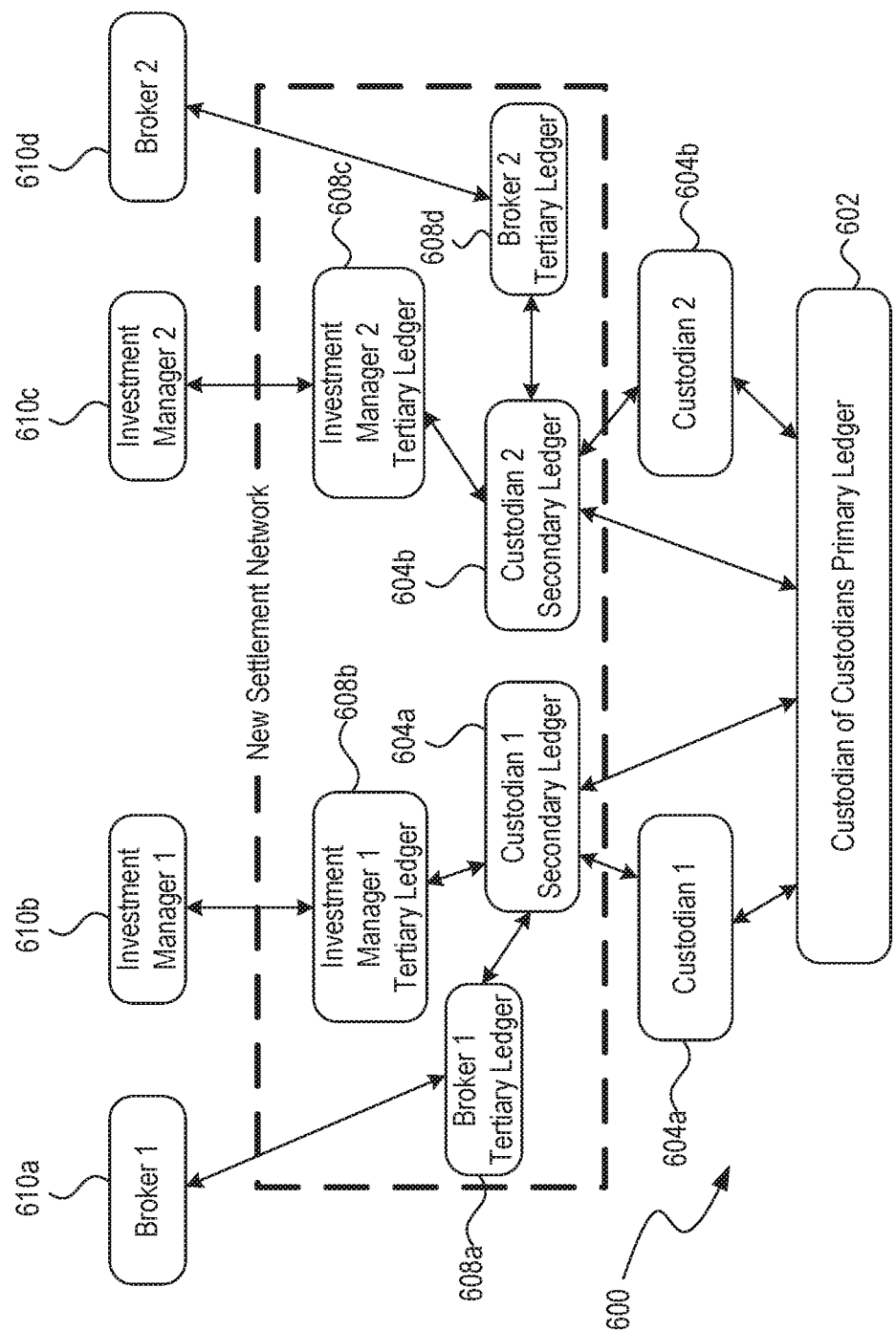
FIG. 6 illustrates the custodial relationships generated by a system that uses distributed ledgers to provide audits in real-time as may occur in some embodiments.

FIG. 6 illustrates custodial relationships generated by a system 600 that uses immutable ledgers to provide audits in real-time as may occur in some embodiments. In order to record assets balances in real time, the primary ledger 602 uses a timestamped, immutable electronic balance sheet 603, capable of handling a high volume of transactions. This balance sheet 603 will include a timestamped transaction log. Timestamped ranges of the balance sheet, including transaction log are hashed. The hash value can be kept inside or outside the balance sheet for audit purposes.

The primary ledger is an append-only data structure of unalterable history, and each data block within the ledger contains a cryptographic hash. The cryptographic hash is a function that is nearly, if not entirely, impossible to invert (i.e., recreate the input data from its hash value alone). The cryptographic hash functions generated by the system 600 described herein reveal no information about the content of the data block. Further, each hash function in the ledger can be hashed to create a Merkle Root. The Merkle Root, which is the hash of all the hashes of all transactions within a data block, can securely verify all of the block hashes in a ledger without disclosing any information about those hashes. The Merkle root may also be used to securely verify that a transaction has been accepted. More specifically, accepted transactions could be verified by downloading the Merkle Root and any block headers, rather than the entire ledger.

The system 600 further include additional ledgers including secondary ledgers 604a-b which correspond to custodians 606a-b. Custodians 606a-b may be able to simply pull data from secondary ledgers 604a-b to initiate account updates. Secondary ledgers 604a-b contain an incomplete history of transactions. The secondary ledgers 604a-b include only those transactions corresponding to securities held by the associated custodian 604a/606a and 604b/606b. The system 600 further includes tertiary ledgers 608a-d which are include only transactions for securities controlled by traders 610a-d.

The balance sheet 603 keeps track of a plurality of assets. These assets might include currencies, shares of stock, or other securities. Operations to the balance sheet 603 allow for traders 610 or other users to deposit, withdraw, or exchange assets. In addition, operations can be reversed by applying the opposite of an earlier transaction.

There are currently many different ways to keep track of account balances in real time. One popular way is to store account balances in a SQL relational database or a "NoSQL" database such as a key-value store. This method is only scalable up to the maximum transaction rate that a particular server is able to handle. In order to achieve higher transactions per second, systems are often "sharded" across multiple servers.

Once the network is partitioned, the well-known "CAP theorem" states that it is impossible to guarantee both consistency and availability (as defined by the theorem). Not wanting to sacrifice availability, many systems settle for "eventual consistency".

Relying on "eventual consistency" has many problems. One is that it forces the application developer to place additional checks on data which there is reason to suspect may be out of date before performing operations. Just like any software, it is easy for the application developer to make errors and create bugs in this code. It may be possible for applications to accidentally corrupt such data. In some cases where transaction logs are lost or not recorded, it may be impossible to repair corrupt data. In other cases, it may be possible, but difficult and tedious.

In the field of "Big Data", a technique has been developed to process and query large streams of data in real-time known as "Lambda Architecture". One key to "Lambda Architecture" is that data is all stored as append-only and immutable. Operations are performed on data in batches and also in real-time. The "CAP Theorem" still applies in "Lambda Architecture", and data is eventually consistent. However, timestamped batch processing provides a reference point for the eventual consistency.

A simple "Lambda Architecture" example is to imagine a process that counts how many times a particular word has been tweeted through all history. Thousands of tweets are being generated every second. In this hypothetical example, the number of times a word occurs in all tweets for a given hour is counted by a batch process. Each hour, the total count is added to the previous total to maintain a running hourly total. Suppose in the middle of an hour, a user wants to query the total real-time count. To generate the answer, a real-time process counts the number of times the word occurred in all tweets during the past partial hour (not yet included in the hourly batch processing). The real-time process then adds that number to the total count calculated from hourly batch processing history.

It is possible for this real-time count to be inaccurate, and inconsistent with the actual number of times a word was tweeted. For example, if a user generated the tweet immediately before the count query was executed, the new tweet might not get counted in the total. However, the hourly batch processing gives a consistent and accurate count for a given point in time, so a user knows that the count must be equal to the total count at the end of the last hour plus the real-time running total count for this partial hour only.

Some embodiments make use of techniques found in "Lambda Architecture" in order to create an immutable transaction log and balance sheet of assets that can scale to millions of transactions per second. The architecture is highly scalable, fault tolerant, highly available, and updated in real-time.

Two distributed clusters of services are set up to handle the incoming transaction stream. These two services are the "Workers" and the "Supervisors". Workers are responsible for taking each transaction report in the stream and processing them. Each report is processed for both the transaction log and balance sheet. In addition, the balance sheet and transaction logs each have batch jobs, real-time jobs. Enough workers are spawned to handle the real-time load. For example, if it takes a worker one second to process a report completely, and 1000 reports are generated per second, at least 1000 workers are spawned to process jobs, or a backlog will occur. The system scales workers dynamically to handle larger loads during peak transaction volume times.

Supervisors have several roles in supervising the workers. Supervisors ensure that reports are allocated correctly to worker processes so that each job is only processed once, and the work is spread out to all available workers in parallel. Supervisors coordinate how messages are passed between workers. A report may need to go through several steps, from several different workers before it is processed. Supervisors check for failures and try to replay failed jobs. Jobs may fail for any number of reasons, including a worker being powered-off mid-job. Checking for, and replaying failed jobs gives this system fault tolerance.

The workers and supervisors take reports from the transaction stream in order to build a transaction log, and a balance sheet. The transaction log is simply an append-only immutable log of incoming transactions. Every so often, the latest transaction events are appended the full history of transaction log events from batch processing. This is one location where the "Lambda architecture" is utilized. Until the recent transaction events are appended across every node on the primary ledger, the system approximates to provide traders with estimated data.

Each batch process creates a new timestamped immutable transaction log. A hashing algorithm such as a SHA256 Checksum can be run on the transaction log. The checksum can then be appended to the transaction log, or kept outside the transaction log in a checksum log. A checksum helps to audit and ensure that data in the transaction log is not changed.

Occasionally, it may be desirable to prune the transaction log for disk space savings. In order to allow for this, checksums may be created on a rolling basis. For example, if checksums are generated hourly, weekly, and monthly, log data older than a month can be dropped from a working transaction log (and possibly archived), while still using existing checksums to audit current log data.

In addition to a transaction log, a balance sheet is also generated by worker processes. The balance sheet creates a record with the total amount an account holds of any given asset. For each transaction, an amount changes on a balance sheet for one or possibly several assets. However, data is never mutated on these balance sheets. Rather, the amount value for each asset is timestamped. When the value changes, a new record is created and appended to the balance sheet with the current timestamp.

In order to query the most recent balance sheet records, the system only return the most recent record for each asset.

Like transaction logs, balance sheets can be hashed, and the hash can be recorded for audit purposes. In addition, old balance sheet data can be discarded and archived when it is deemed no longer needed for a given application.

Balance sheet audit hashes and transaction log audit hashes can be appended to an audit hash file. This file itself can be hashed, and the resulting checksum can be used to guarantee the integrity of an enormous number and size of records.

It is possible for a short window of time to double-spend assets. For example, where a user has $1000 on a balance sheet, and would like to withdraw that $1000 twice. If that 2 workers process append a withdraw transaction to the transaction log, and update the balance sheet at exactly the same instant.

Accordingly, there is also an error checking worker process. After the double-spend occurs, the error checking worker will discover the error. The error checking worker then applies a transaction to the transaction log to reverse an invalid transaction, and the error checking worker then updates the balance sheet.

Additionally, business logic that reads the balance sheets can be programmed to only trust data older than a few seconds. Accounts with high numbers of transaction reversals could also be frozen and manually investigated for fraud.

Figure 7:
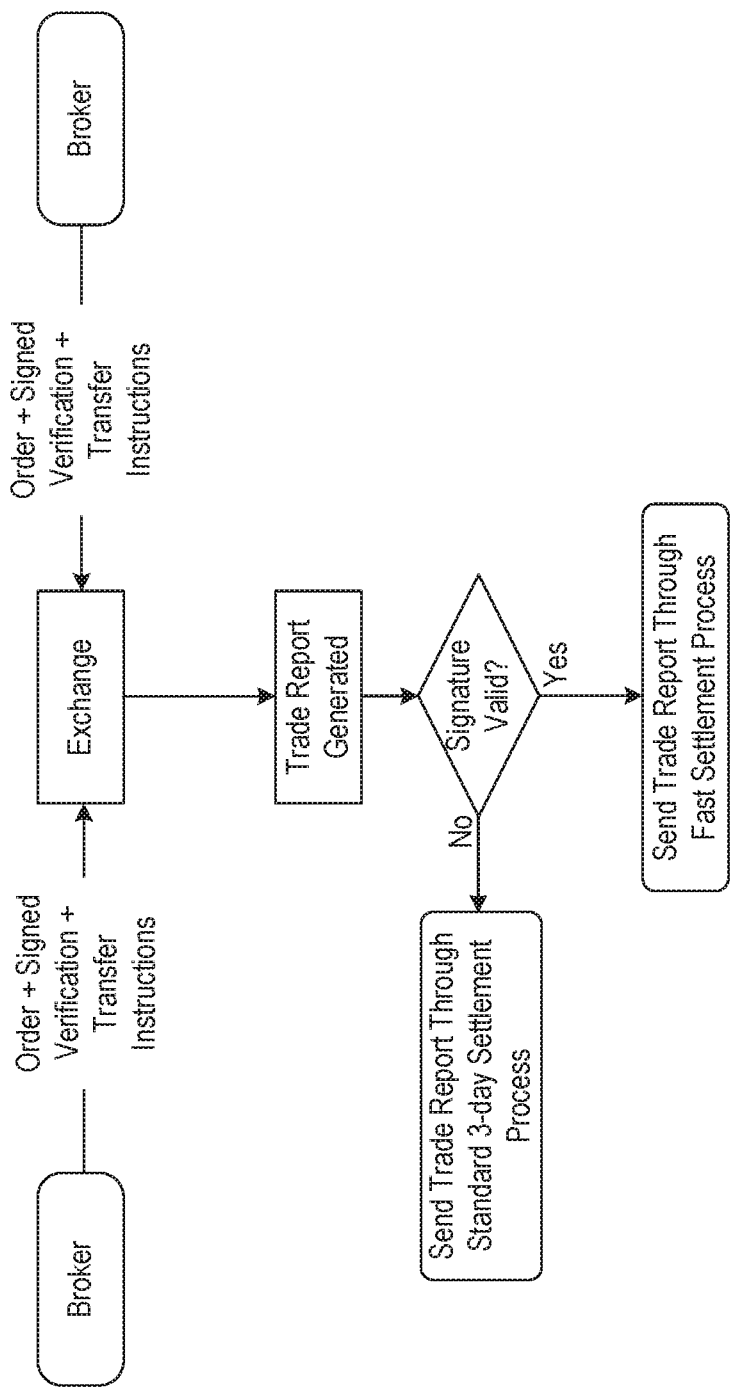
FIG. 7 illustrates the default fallback position if the system determines the clearing instructions are invalid as may occur in some embodiments.

FIG. 7 illustrates the default fallback position if the system determines the clearing instructions are invalid as may occur in some embodiments. More specifically, some embodiments provide that a system (e.g., system 600 of FIG.

6) determines whether the necessary conditions are met in order to use the "fast track" settlement process described herein. For example, the system may determine whether the cryptographic signature of the order is valid (i.e., matches the cryptographic private key owned by the broker). If the system determines conditions are not met (e.g., signature invalid), then the trade simply reverts back to the traditional three-day settlement process, which is described in-depth above with respect to FIGS. 1-4.

Figure 8:
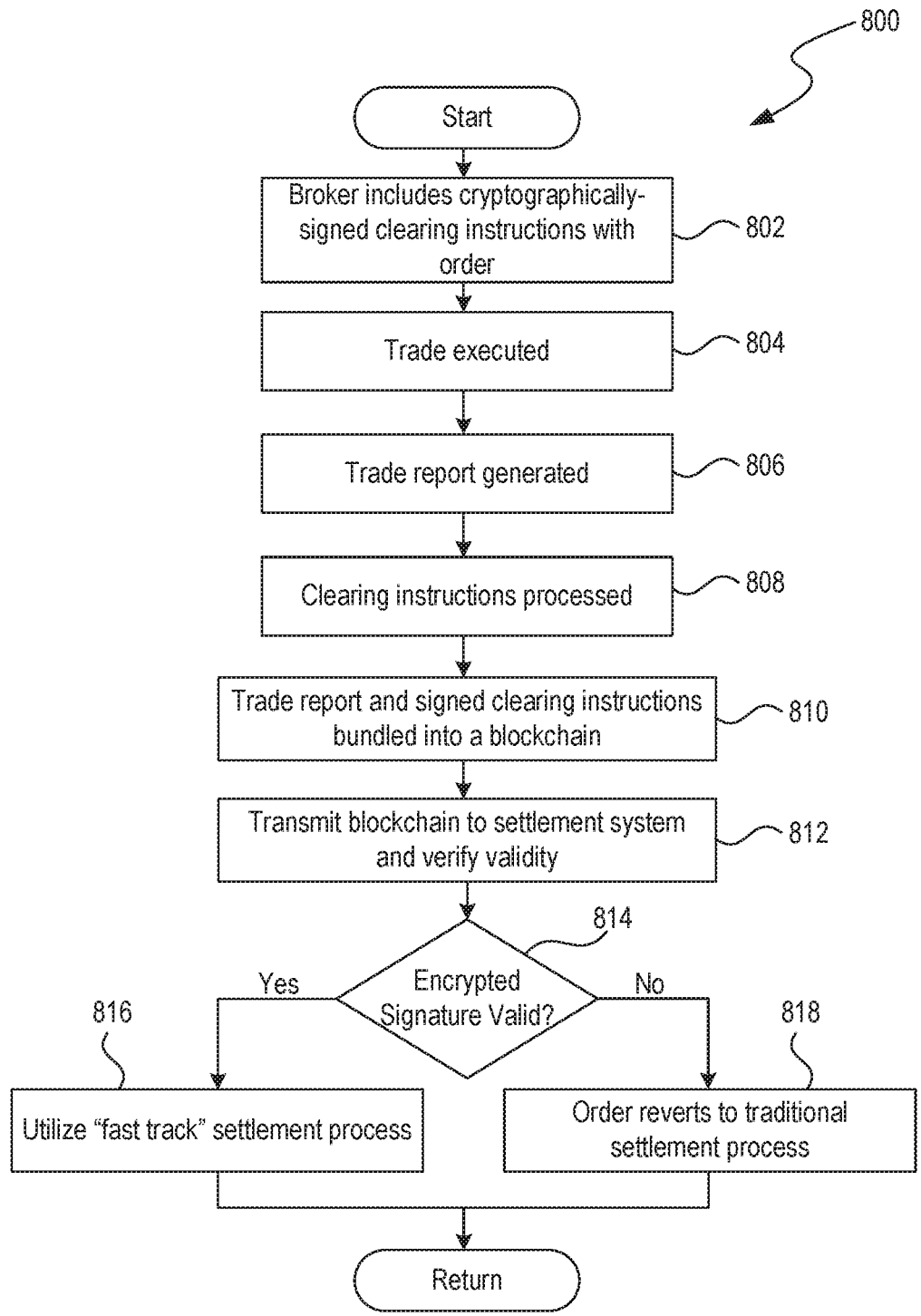
FIG. 8 is a flow diagram of a process for enabling gross settlement of executed trades in real-time according to various embodiments.

FIG. 8 is a flow diagram of a process 800 for enabling gross settlement of executed trades in real-time according to various embodiments. At step 802, numerous brokers include cryptographically-signed clearing instructions with an order to be executed by an exchange. In some embodiments, each trade includes various cryptographic keys that are used to verify each of the parties to a transaction. For example, an order can include the private key of the seller, public key of the seller, and public key of the buyer. A public and private key pair includes two uniquely related cryptographic keys. As described above, the public key is generally published periodically and made available to those that use the system (e.g., brokers). The private key, however, remains confidential to its respective owner (e.g., a particular broker). Because each public/private key pair is mathematically related, the public key can only by decrypted by the "matching" private key.

At step 804, a plurality of trades across the monitored network are executed by the exchange. At step 806, the exchange generates a stream of trade reports summarizing the transactions. At step 808, the clearing instructions are processed and transmitted to the appropriate clearing broker(s). At step 810, the trade report and/or signed clearing instructions are processed and observed by a plurality of worker programs and supervisor programs each running on one of a plurality of nodes associated with the primary ledger. Processed transactions are placed into data blocks on the primary ledger. Each transaction in a data block is cryptographically signed with public and/or private keys that allow various parties (e.g., brokers, settlement system) to decrypt the transaction.

At step 812, the primary ledger propagates through to the lower tiered ledgers. Only data blocks relevant to the lower tier ledgers is propagated to each individual lower tier ledger. This enables the lower tier ledgers to be more light weight and require less disk space. Transactions that occur across more than one lower tier ledger include instructions in the transaction record that provide reference to the other lower tier ledgers. In this way, to view the entire transaction record, one may view the primary ledger, or view the combination of relevant data blocks on the relevant lower tier ledgers. to the settlement system, which can then verify the validity of the order by analyzing the encrypted signature. As shown at step 814, If the settlement system determines the cryptographic signatures are valid, the order will proceed using the "fast track" settlement system described herein, as shown at step 816. However, the order will revert to using the traditional three-day settlement process if the system determines the signature is invalid (e.g., from possible tampering), as shown at step 818. Valid signatures will cryptographically match and no error will appear in the ledger. Non-matching signatures at one node will not propagate to other nodes and the consensus of the primary ledger ignores the erroneous node until that node is repaired.

Consequently, the process 800 allows every broker transaction to be tracked and recorded using a cryptographic ledger infrastructure. Moreover, the process 800 is able to ensure validity by verifying the cryptographic key(s) used for each order. Highly decentralized and redundant verification makes broker review unnecessary, thereby significantly reducing the time needed to deliver securities.

Figure 9:
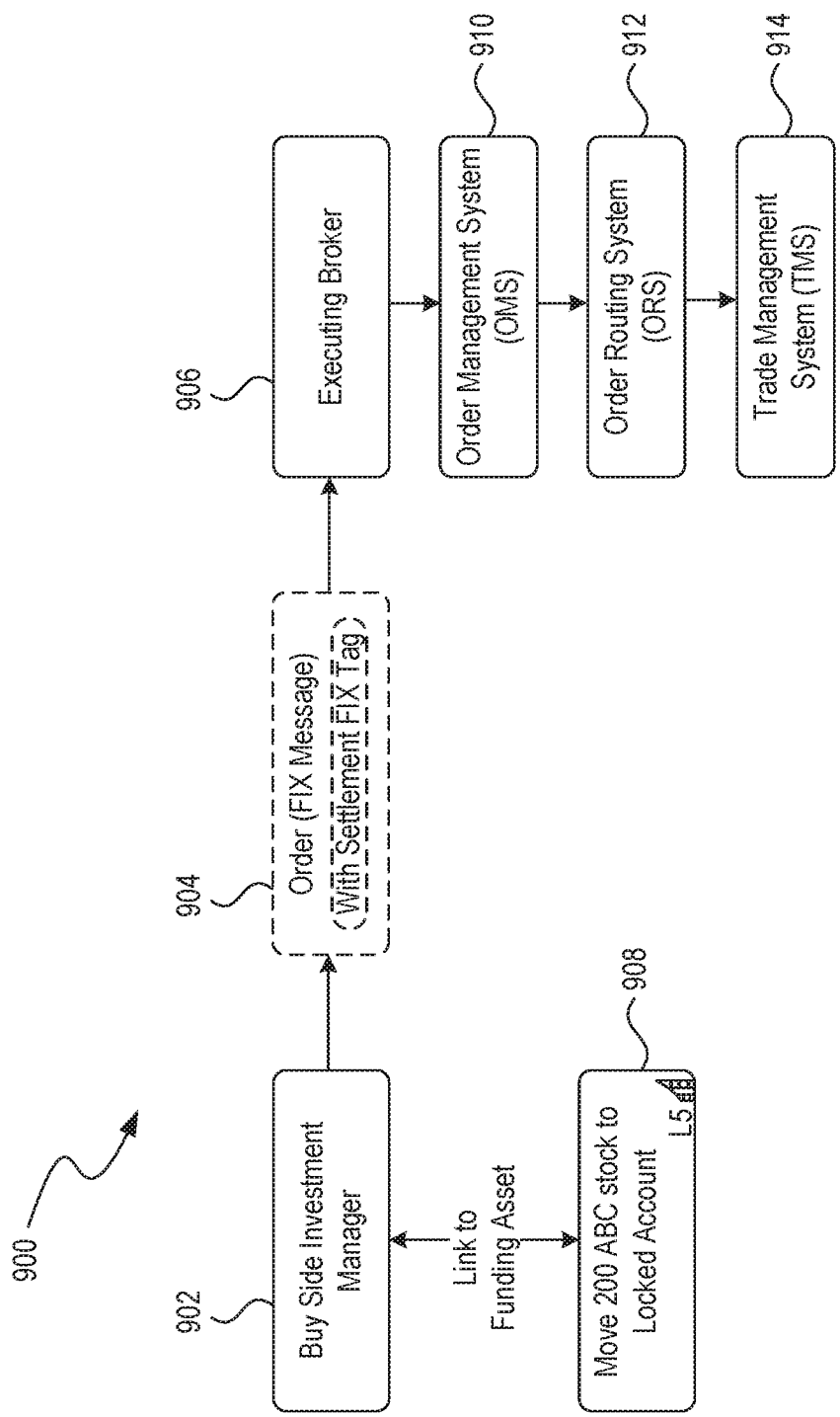
FIG. 9 is a communication chart describing an investment manager interacting with an order management system.

FIG. 9 is a communication chart describing an investment manager interacting with an order management system. A Investment manager 902, such as BlackRock, or other equivalent, uses existing order entry software that has a settlement FIX Tags 904. In some embodiments a settlement FIX tag 904 is a short hash of 30-50 characters. Once received, in order entry software, the settlement FIX tag 904 is matched up with further settlement instructions which include many more characters. The signed order instructions must match the original settlement FIX tag 904 when hashed to show the instructions are genuine.

The settlement FIX Tag 904 allows the trader 902 to link an order to a funding asset recorded on tertiary ledger (e.g. ledger 608 of FIG. 6) 908. The settlement FIX Tag 904 will authorize a broker 906, such as Morgan Stanley or other equivalent, to send settlement instructions to an order management system 908, and instruct the order management system (OMS) 910 to straight-through-process (STP) and real-time gross settle (RTGS) the trade. The instructions are encrypted and hashed to reduce latency. An order routing system (ORS) 912 selects available shares for the broker 906, and a trade management system (TMS) 914 reports the trade to the primary ledger (e.g. ledger 602 of FIG. 6).

The trader 902 will have a copy of the tertiary ledger 908 on their server or PC. During order entry, settlement system software designates funding assets on the tertiary ledger, locking that asset to the order. Ledger software creates a new data block on that tertiary ledger 908 and moves the funding asset out of an "available" account to a "locked" account. For example, if the trader's 902 tertiary ledger shows 1,000 shares of ABC stock available, and the trader 902 enters a limit order to sell 200 ABC, then 200 ABC is moved into a "locked account". Which 200 shares The movement of 200 ABC to a locked account is propagated through all levels and tiers of ledgers, establishing a consensus. This prevents double spending, eliminating counterparty risk. (If the trade is canceled, the locked ABC will move back to the available for sale account.) When a trade is executed the ORS 912 uses settlement instructions and authorizations to STP and clear the trade. The TMS 914 then RTGS (reduce locked ABC, increase cash vs. the counter party), by applying ledger updates to the primary ledger and propagating the updates to lower tier ledgers, establishing a new consensus. The Investment Manager 902 cannot mistakenly sell something not owned, trades STP and RTGS reducing risk and settlement costs.

Figure 10:
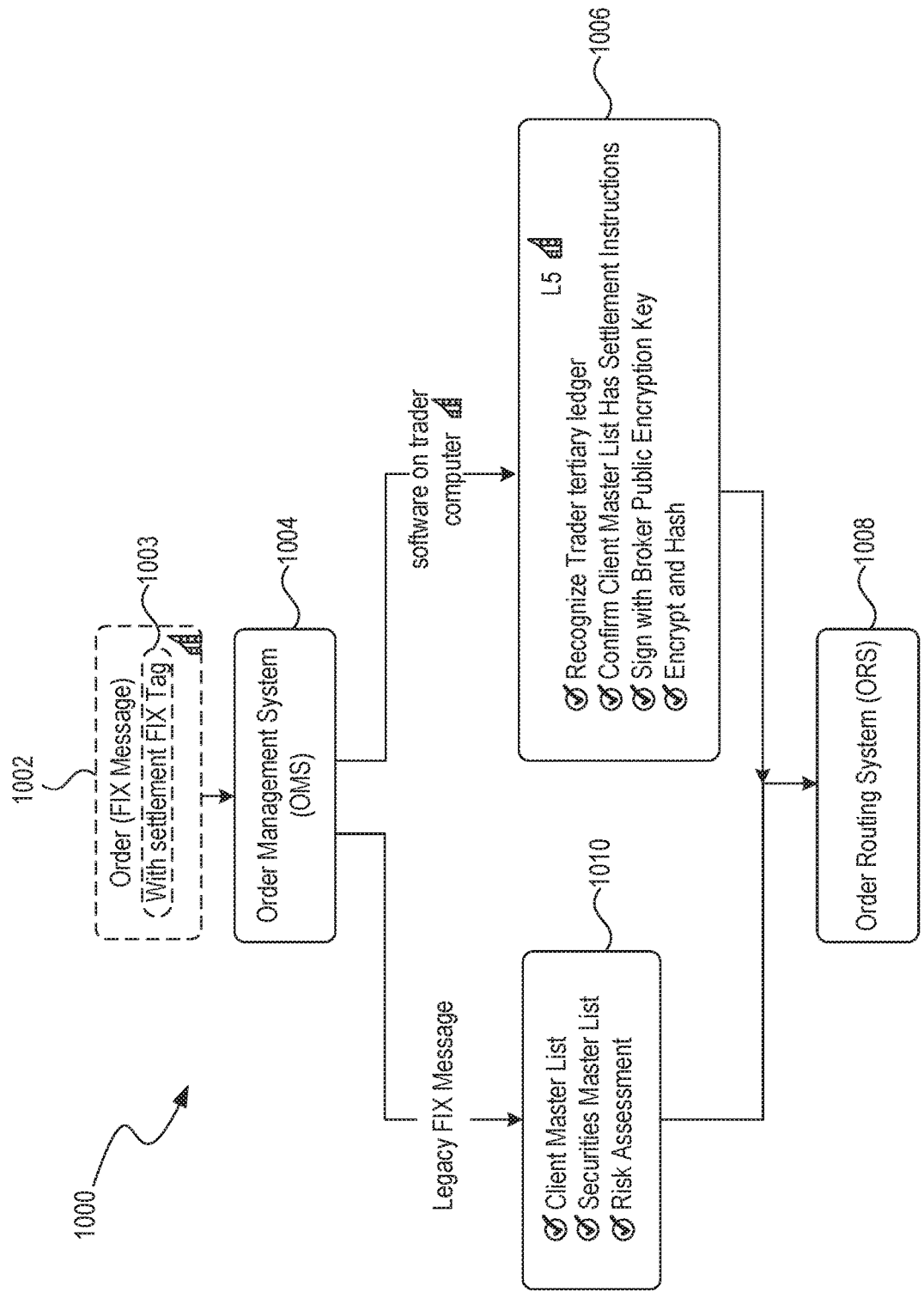
FIG. 10 is a communication chart describing a broker interacting with an order management system.
Figure 11:
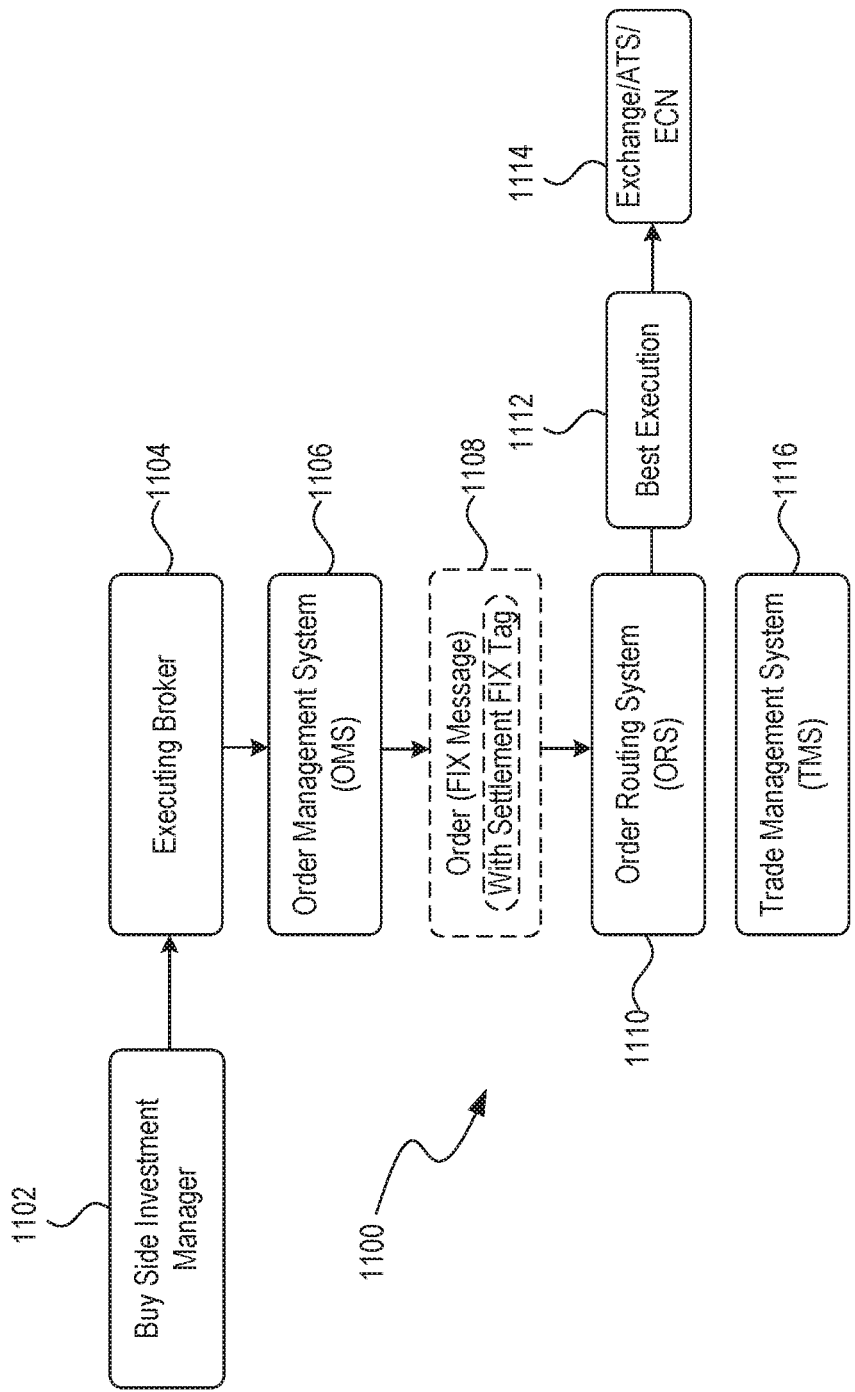
FIG. 11 is a communication chart describing a broker executing trades.

FIGS. 10 and 11 are a communication chart describing a broker interacting with an order management system and a communication chart describing a broker executing trades. An executing broker, such as Morgan Stanley or an equivalent, runs an order 1002 through the Order Management System (OMS) 1004 which checks the Client Master List and Security Master List. An embodiment of that order 1002 will include a settlement FIX tag 1003. Simultaneously, the OMS 1004 will send the settlement FIX tag 1003 to a new Hardware Security Module (HSM) 1006, the HSM 1006 is a software module installed in the broker's data center.

The HSM 1006 will receive, process and send the settlement FIX tag 1003 to the Order Routing System (ORS) 1008. When accepting settlement FIX tags 1003, the ORS 1008 confirms the broker has instructions, but does not attach them for latency reasons. The ORS 1008 additionally signs transactions with varying public keys that change based on assets sold. Encrypting instructions within the ORS

1008 prevents information leakage, and hashing reduces data transfer and latency. The executing broker's ORS 1008 sends the order out for best execution.

The ORS 1008 also receives legacy FIX messages 1010. Legacy messages 1010 are still processed at the T+3 rate.

FIG. 11 illustrates the same process as FIG. 10 in flowchart form.

Figure 12:
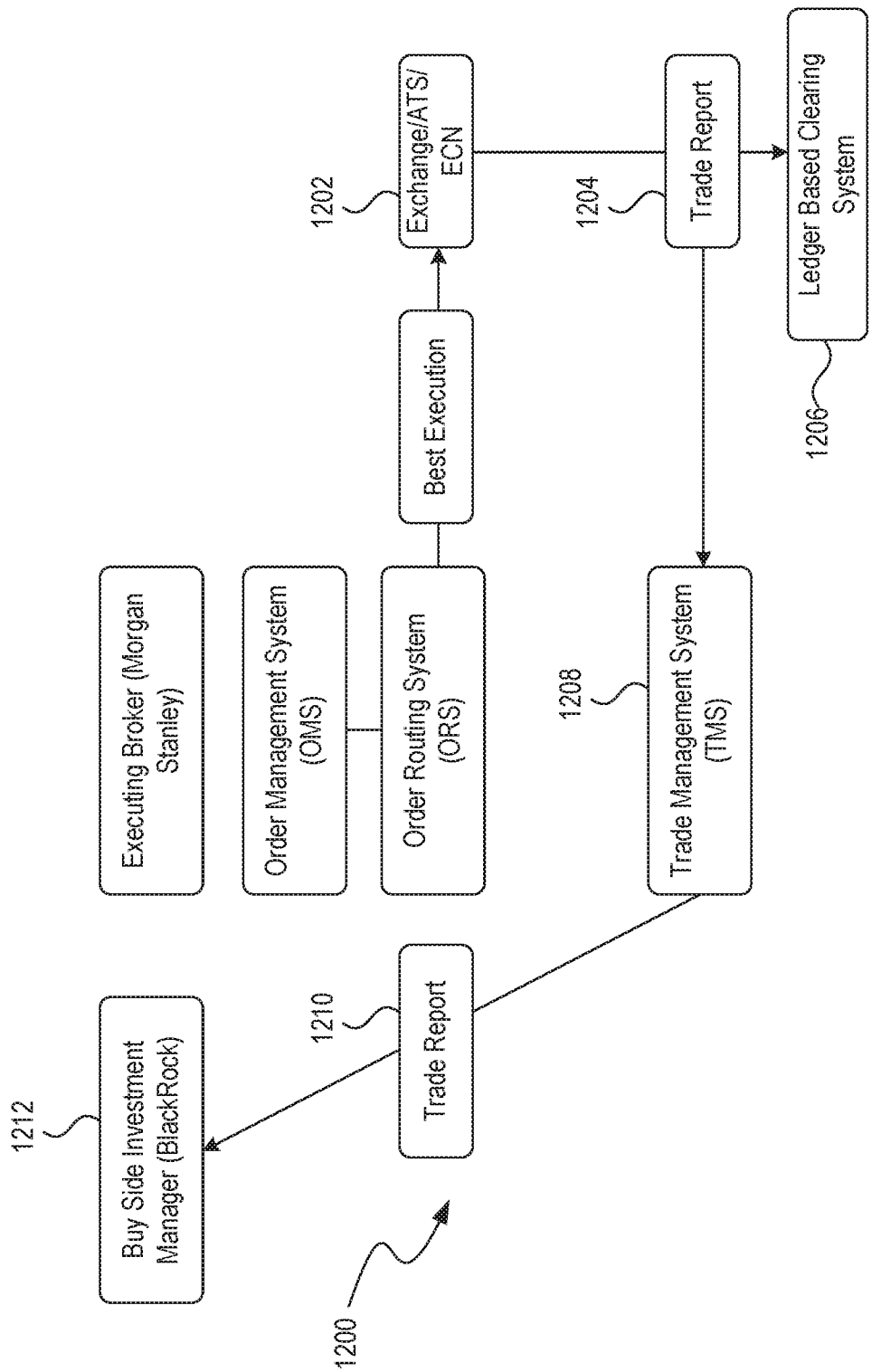
FIG. 12 is a communication chart describing actions taken by an exchange.

FIG. 12 is a communication chart describing actions taken by an exchange. The exchange 1202 receives an order and recognizes the settlement FIX tag. The exchange forwards a copy of the trade report 1204 to the ledger based clearing system 1206. Because the settlement FIX tag has been encrypted and hashed, only ledger based clearing system can see the data, so there is no information leakage. Exchanges will benefit because industry participants will prefer exchanges that support. STP and RTGS. Exchanges will also cuts costs of managing trade fails.

Figure 13:
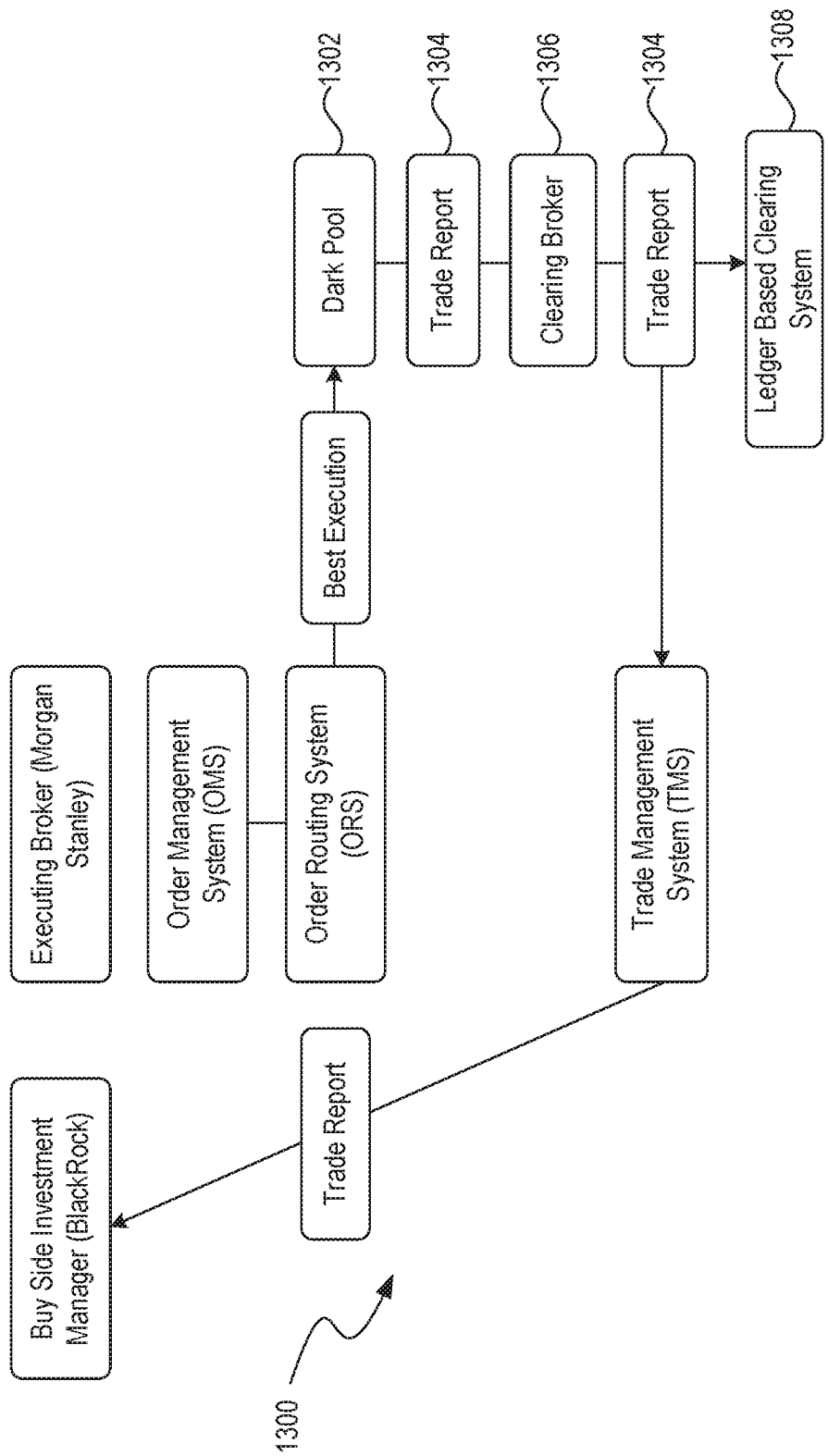
FIG. 13 is a communication chart describing how a clearing broker interacts with a dark pool exchanges.

FIG. 13 is a communication chart describing how a clearing broker interacts with a dark pool exchanges. The procedure is very similar to those of FIG. 12. Dark pools 1302 send trade reports 1304 to clearing brokers 1306. The clearing broker installs the same software that exchanges use to forward the trade report to the ledger based clearing system 1308. Clearing brokers 1306 will benefit because dark pools 1302 will prefer exchanges that support STP and RTGS. Clearing brokers 1306 also cut costs related to managing trade fails.

Figure 14:
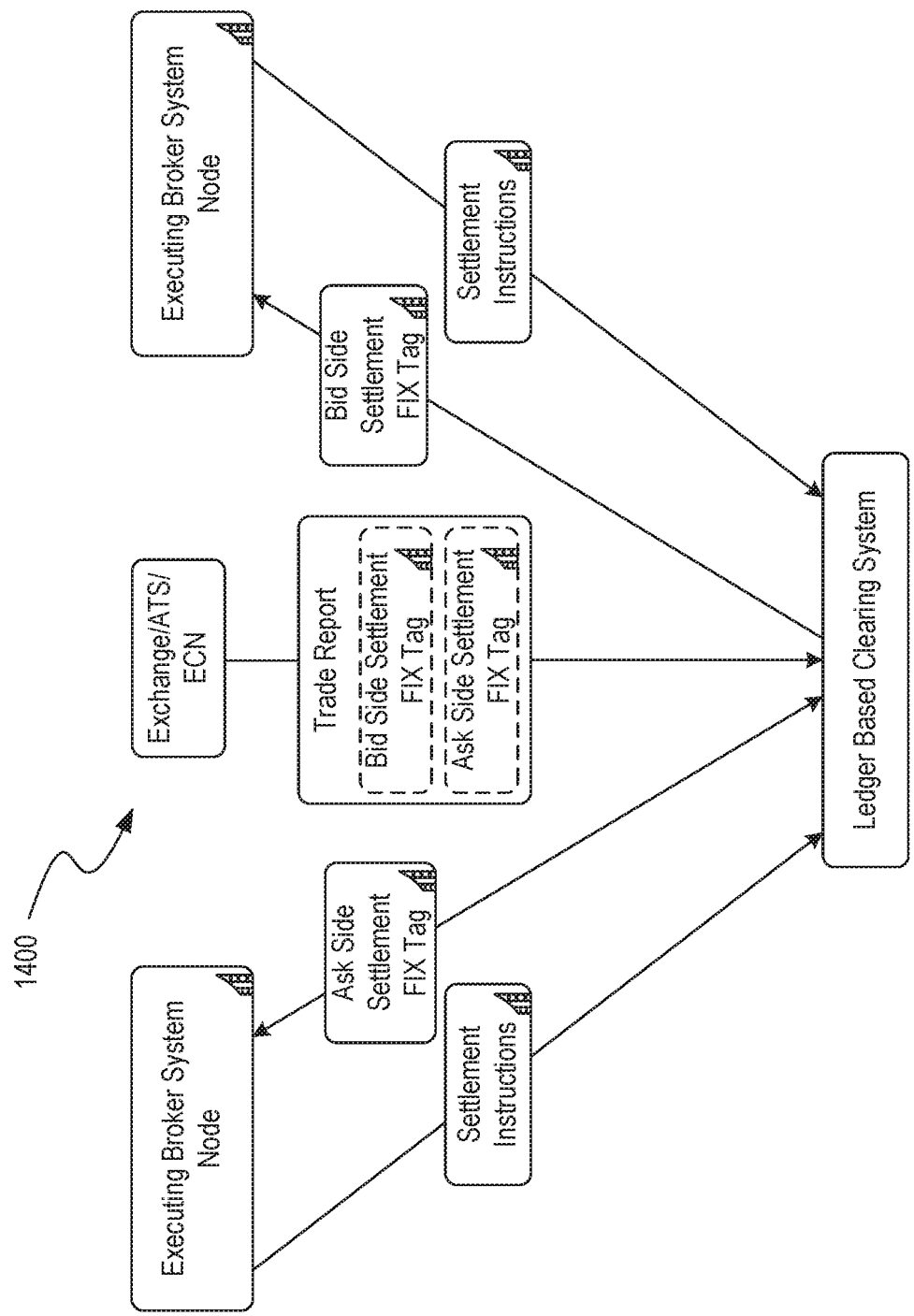
FIG. 14 is a communication chart describing clearing system interaction with an external system nodes.

FIG. 14 is a communication chart describing clearing system interaction with an external system nodes. Ledger based clearing system 1402 receives trade reports 1404 from the exchange 1406, and uses the settlement FIX tags 1408*a-b* (which are 40-character hashes) to request settlement instructions 1410*a-b* from executing brokers through each respective system node 1412*a-b*. Settlement instructions 1410*a-b* are often 1200+ characters in length; accordingly, transferring 40 character hashes is much faster and less demanding on latency. The system nodes 1412*a-b* collect settlement instructions from the client master list, and reply to the ledger based clearing system 1402 using brokers' encrypted signatures. The signed order instructions 1410*a-b* must match the original 40 character hash 1408*a-b*, when hashed. The Clearing system 1402 effects RTGS by updating ledgers on the primary ledger L1 and propagating changes to lower tier ledgers L2-L5. The ledger based clearing system 1402 internalizes settlement, and depository trust corporation (DTC) records do not change.

Figure 15:
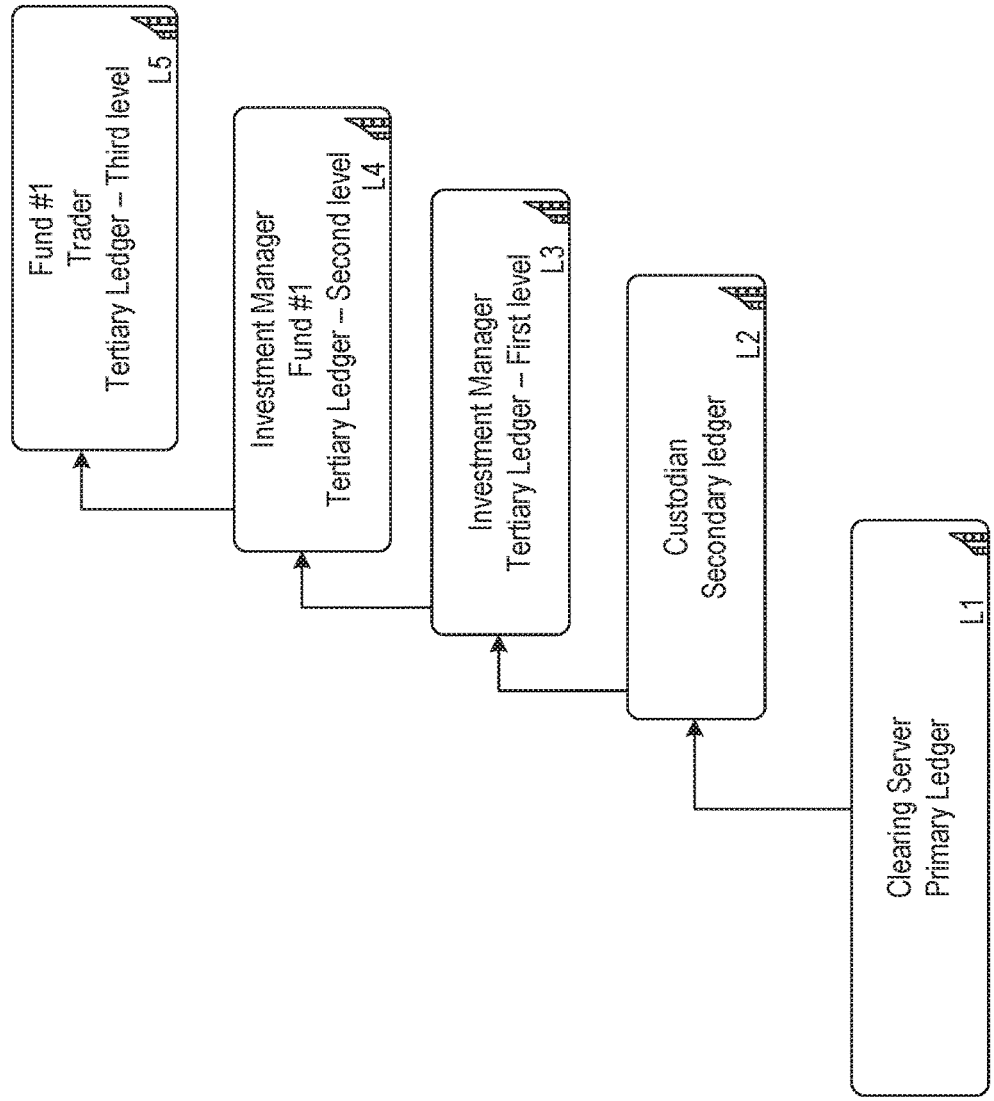
FIG. 15 is a block diagram describing an embodiment of tiers of cryptographic ledgers.

FIG. 15 is a block diagram describing an embodiment of tiers of cryptographic ledgers. Each block represents a level of append-only cryptographic ledger. At the first level L1, there is only a single primary ledger. Every level above that branches out into exponentially more ledgers. L1-L3 comprise the primary, secondary, and tertiary ledgers. L3-L5 comprise the three levels of tertiary ledger.

Investment Mangers hold stock at Custodians. Custodians' relationships with their clients do not change. Custodians continue to service their clients and their clients' assets. Custodians can now provide enhanced services to their clients by offering STP and RTGS. Custodians can administer assets more efficiently on Secondary ledgers L2. Custodians will instruct DTC to move securities onto the primary ledger L1. By holding securities for multiple custodians, the primary ledger L1 can internalize and RTGS trades that would otherwise settle at DTC. The primary ledger uses brokers' encrypted signatures to STP clear trades, and apply ledger updates to the primary ledger L1 to achieve RTGS. Ledger updates will automatically propagate lower tier ledgers L2-L5.

The Custodians, Investment Managers, families of funds and individual traders can view and move assets based on Network permissions. If a Custodian wants to offer RTGS to a client, the custodian will instruct DTC to deposit assets with the ledger based clearing system for the benefit of the Custodian. The ledger based clearing system records the securities on the primary ledger L1. This can be done promptly. If an executed trade does not have settlement FIX Tags for both sides, the settlement diverts to DTC. In this case, the ledger based clearing system will deliver the securities to DTC for the Custodian's account.

When reporting to their clients, Custodians will provide consolidated reports showing assets held directly at DTC and at DTC through the ledger based clearing system.

In some embodiments, settlement banks open accounts with the ledger system's Interbank Settlement System (ISS). Settlement Banks will instruct the Fed, using Fedwire, to fund the accounts at ISS on a daily basis. The ledger system will record funds deposited with ISS on the primary ledger L1, and propagate through the lower tier ledgers L2-L5 as appropriate before the start of trading.

Traders can then place orders using settlement FIX tags, which will move cash required to settle trades to a locked account on a low level tertiary ledger L5. When trades are executed, the ledger based clearing system acts as "Settlement Agent" and sends ledger updates to ISS. ISS then sends ledger updates to settlement banks in real time. At the end of the day, the ledger system will send all funds back to the Settlement Bank's account at the Fed, so their account at ISS is flat overnight.

Figure 16:
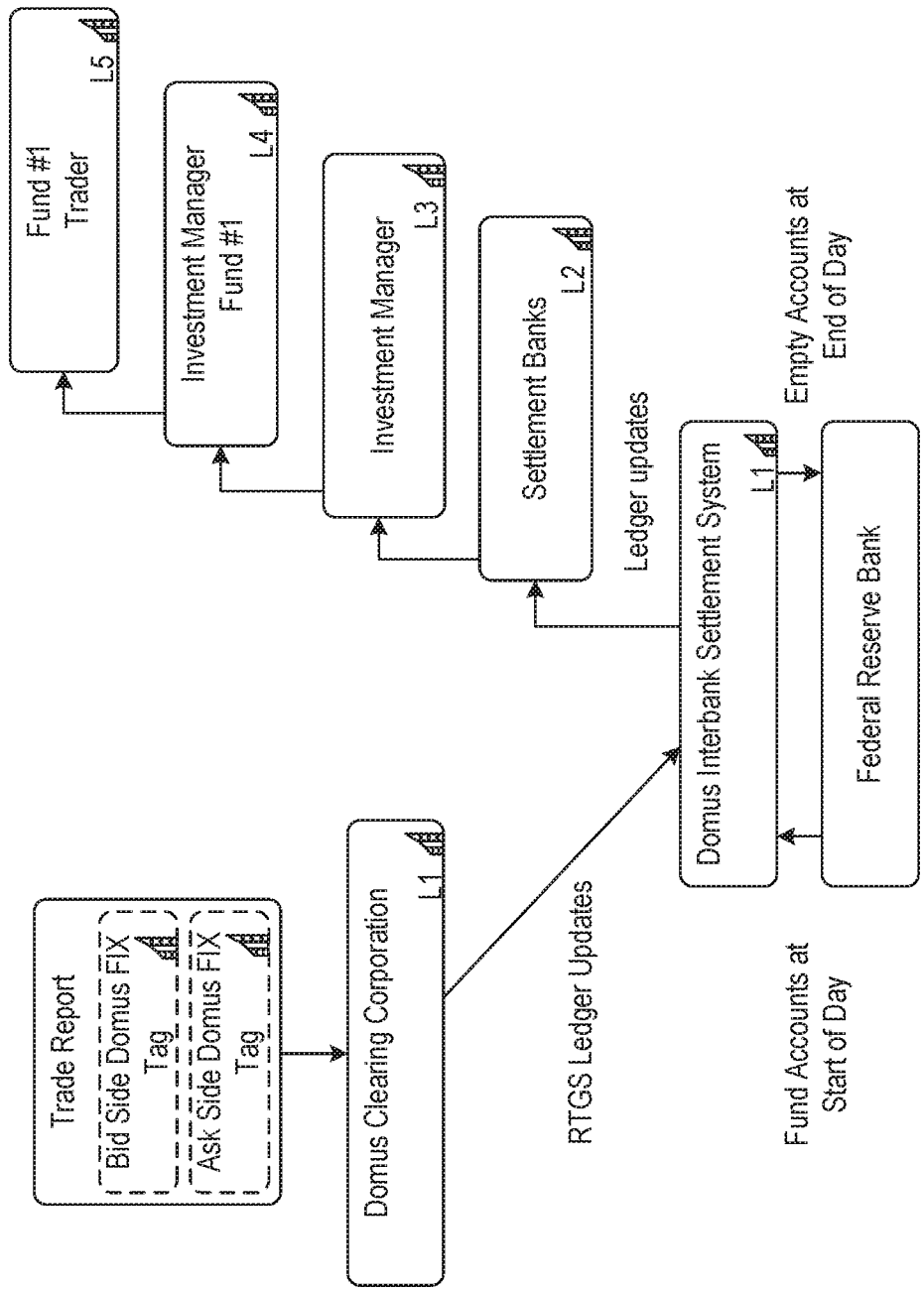
FIG. 16 is a block diagram describing regulatory communication.

FIG. 16 is a block diagram describing regulatory communication. Distributed ledgers, build consensus on private nodes. A sufficient number of private nodes are utilized to satisfy SEC and FINRA regulation. Nodes can also be maintained by the SEC, FINRA, an auditor, and others. Special ledgers that containing hashed data are made available for audit purposes. The entire history of the cryptographic ledgers can be audited and confirmed by regulators and accountants in real time, any time, against immutable content. The ledger system makes secondary ledgers L2 available to DTCC so the DTCC can service custodian assets directly.

Figure 17:
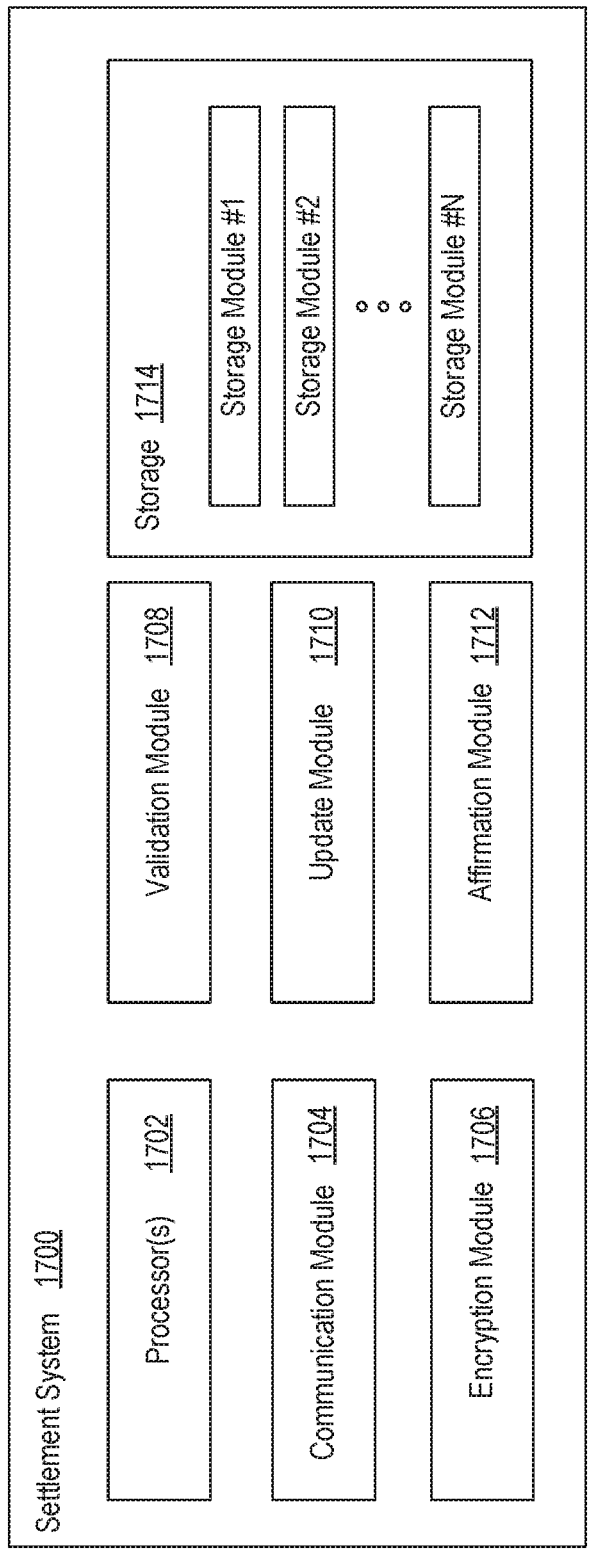
FIG. 17 is a block diagram with exemplary components of a settlement system 900 for accelerating the settlement process.

FIG. 17 is a block diagram with exemplary components of a settlement system 1700 for accelerating the settlement process. According to the embodiment shown in FIG. 17, the system 1700 can include one or more processors 1702, a communication module 1704, an encryption module 1706, a validation module 1708, an update module 1710, an affirmation module 1712, and a storage 1714 that includes a first storage module, second storage module, etc., through an Nth storage module. Other embodiments of the settlement system 1700 may include some, all, or none of these modules and components, along with other modules, applications, and/or components. Still yet, some embodiments may incorporate two or more of these modules into a single module and/or associate a portion of the functionality of one or more of these modules with a different module.

The communication module 1704 can be configured to receive encrypted orders, signed authorizations, trade reports, etc., from one or more exchanges. The communication module 1704 may be configured to receive the aforementioned materials in real-time (i.e., immediately or shortly after the order is placed by the broker) or at predetermined time intervals. Real-time transmission throughout the day is generally preferred because it lessens settlement risk.

The encryption module 1706 bundles trade reports and signed instructions into the primary ledger, as well as encrypt each data block on the primary ledger using one or more cryptographic public and private keys. Using a primary ledger, the encryption module 1706 may be able to create an unlimited number of lower tier, secondary and tertiary ledgers, which contain a subset of global trade orders. Each data block typically represents a set of updates (e.g., trades) to be made to the accounts of various brokers. However, the orders may also be grouped by broker(s) using, for example, the cryptographic public keys.

When a trade reports are received by a node in the settlement system 1700, the validation module 1708 can determine whether the signature is valid. That is, whether the signature matches the cryptographic private key owned by the broker. An update module 1710 can be configured to generate and transmit account updates for various custodians. In some embodiments, the custodians are able to access a balance audit or ledger that includes all past transactions associated with the custodian.

An affirmation module 1712, together with the validation module 1708, can determine whether a particular trade is eligible for the "fast track" settlement process. For example, if the validation module 1708 determines the signature does not match the broker's private key, the affirmation module 1712 can reject the trade. When a trade is rejected, traditional settlement process is used. However, if the validation module 1708 determines the signature does match the broker's private key, the affirmation module 1712 can flag or tag the trade, which indicates the trade has been verified and is eligible for the "fast track" settlement process.

Storage 1714 can be any device or mechanism used for storing information. Storage 1714 may be used to store instructions for running one or more applications or modules (e.g., encryption module 1706, validation module 1708) on processor(s) 1702. In some embodiments, the storage 1714 includes various cryptographic public and private keys used for validation, ledger records of transactions, audit log(s) of transactions for a particular broker or custodian, etc.

Figure 18:
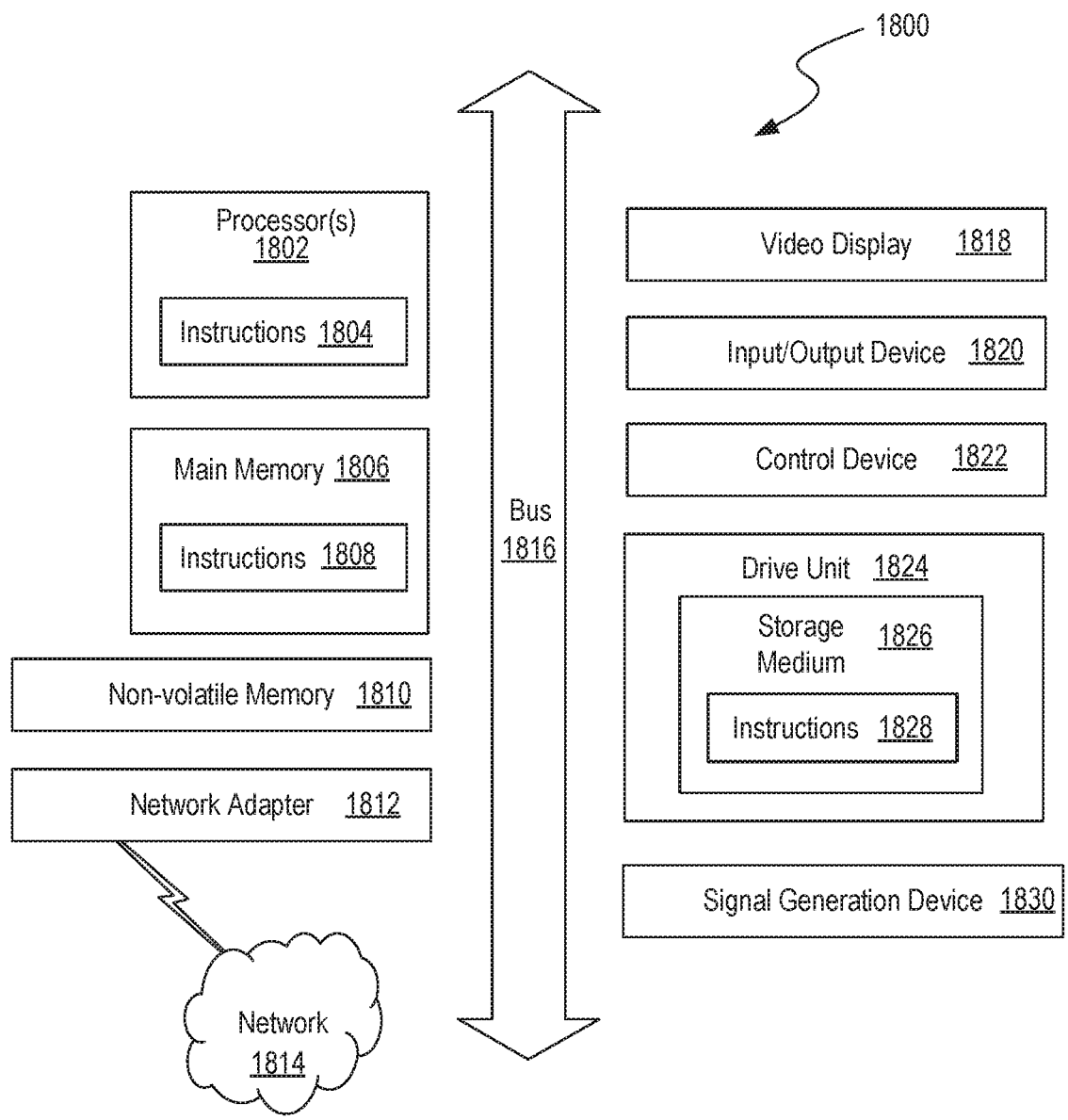
FIG. 18 is a block diagram illustrating an example of a computer system in which at least some operations described herein can be implemented according to various embodiments.

FIG. 18 is a block diagram illustrating an example of a computing system 1800 in which at least some operations described herein can be implemented. The computing system may include one or more central processing units ("processors") 1802, main memory 1806, non-volatile memory 1810, network adapter 1012 (e.g., network interfaces), video display 1818, input/output devices 1820, control device 1822 (e.g., keyboard and pointing devices), drive unit 1024 including a storage medium 1826, and signal generation device 1830 that are communicatively connected to a bus 1816. The bus 1816 is illustrated as an abstraction that represents any one or more separate physical buses, point to point connections, or both connected by appropriate bridges, adapters, or controllers. The bus 1816, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 1800 operates as a standalone device, although the computing system 1800 may be connected (e.g., wired or wirelessly) to other machines. In a networked deployment, the computing system 1800 may operate in the capacity of a server or a client machine in a client-server network environment, or as a peer machine in a peer-to-peer (or distributed) network environment.

The computing system 1800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1806, non-volatile memory 1810, and storage medium 1826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1804, 1808, 1828) set at various times in various memory and storage devices in a computer, and that, when read and executed by one or more processing units or processors 1802, cause the computing system 1800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1810, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 1812 enables the computing system 1800 to mediate data in a network 1814 with an entity that is external to the computing device 1800, through any known and/or convenient communications protocol supported by the computing system 1800 and the external entity. The network adapter 1812 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

The techniques introduced herein can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 19:
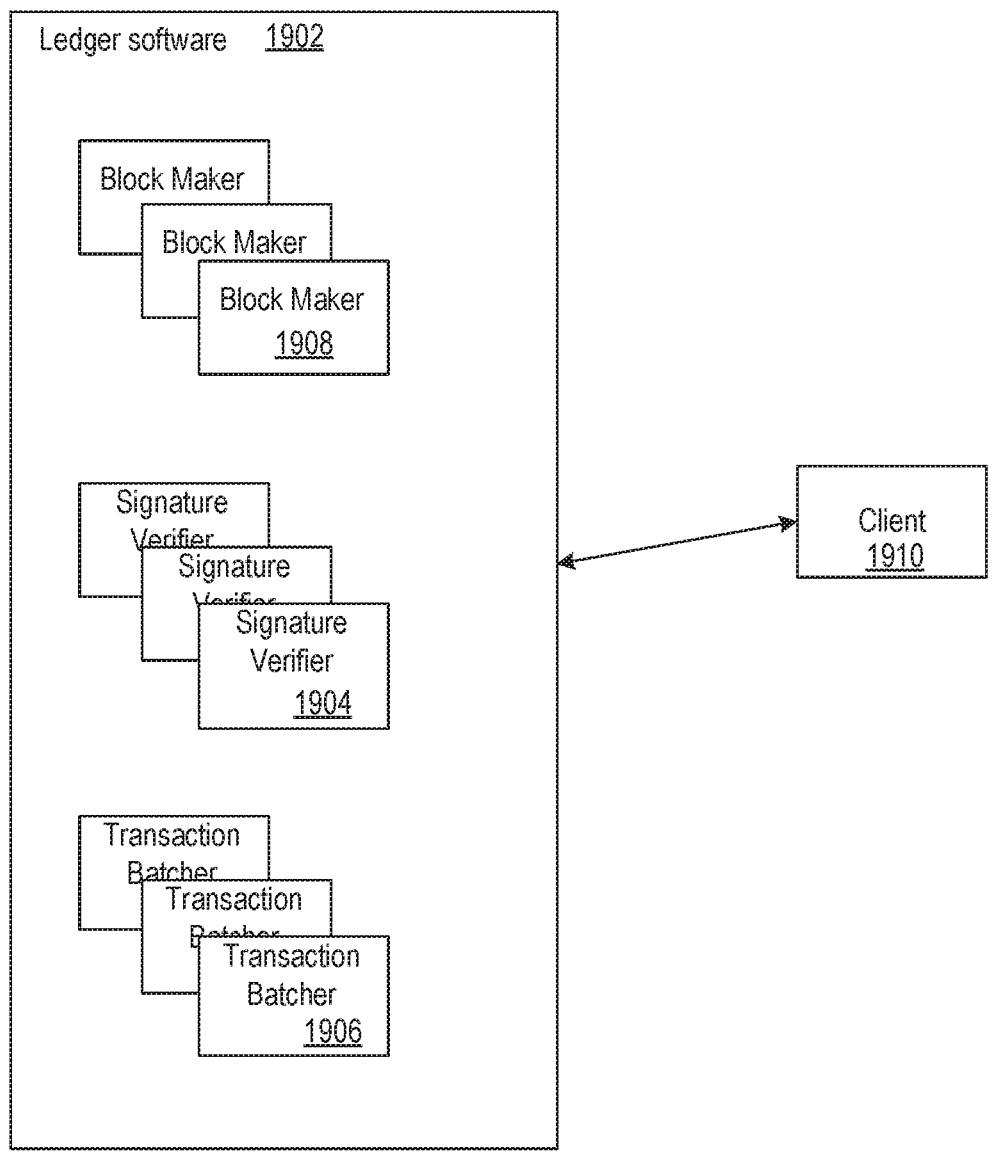
FIG. 19 is a block diagram of the system architecture of append-only ledger generation software.

FIG. 19 is a block diagram of the system architecture of append-only ledger generation software 1902. The ledger software 1902 uses a set of microservices to work together in an efficient, scalable architecture. At the time of filing, the Blockchain ledger of Bitcoin famously only processes seven transactions per second. Seven a second is not sufficient to handle the peak load of securities transactions. Unlike other Block Chains, such as the Bitcoin Blockchain, the ledger software 1902 does not include Proof of Work, Mining, Proof of Stake, or any form of Byzantine Fault Tolerance.

The ledger software 1902 and microservices therein operate on a plurality of computer systems and communicate with one another in a distributed computing fashion. The services are described below and include signature verifiers 1904, transaction batchers 1906, block makers 1908, which all serve clients 1910. A number of each microservice 1904-1908 is instanced as required by the scaled needs of the system and implemented on computer system hardware as appropriate. The comparative relation of the number of each microservice 1904-1908 to one another is non-fixed and is dependent on processing power specifications of the computer hardware each microservice 1904-1908 is instanced on. Clients 1910 generate transactions (abbreviated as "Tx" on figures) and communicate with the ledger software 1902.

Figure 20:
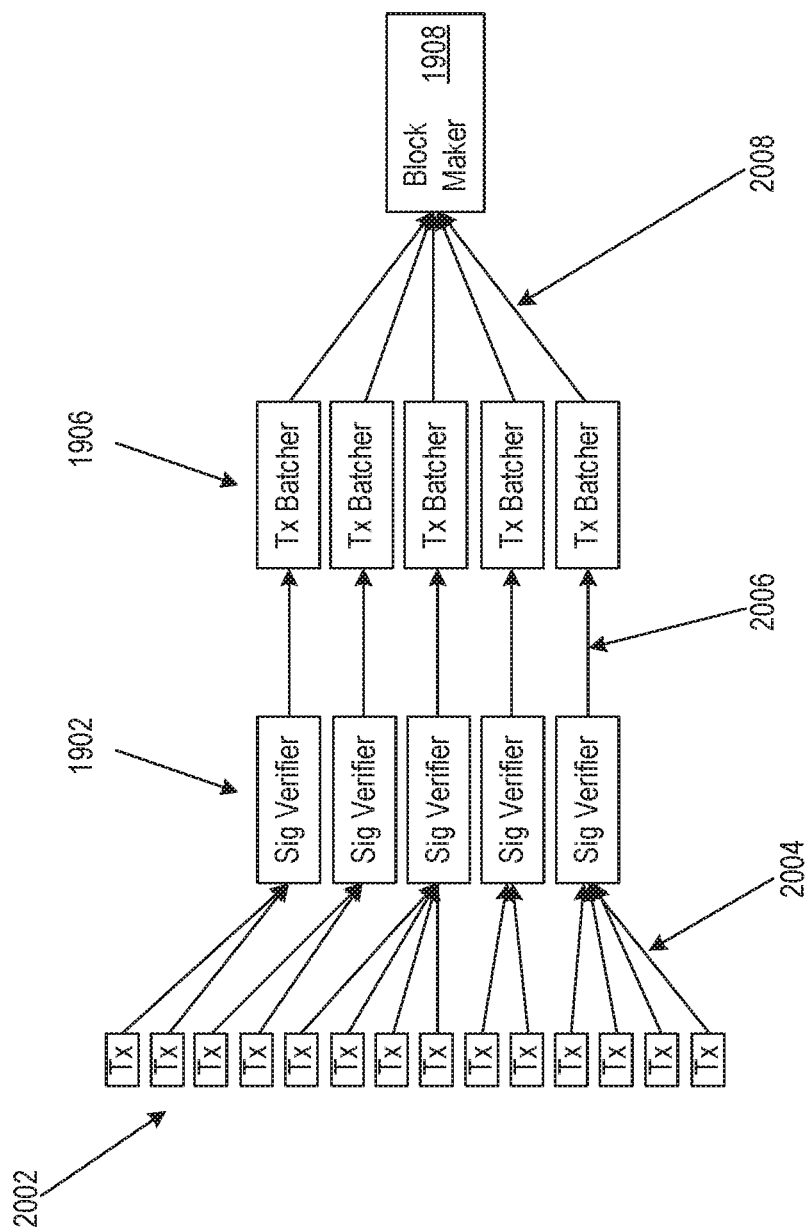
FIG. 20 is a block diagram of transaction batching.

FIG. 20 is a block diagram of transaction verification, batching and block generation. Verifying signatures on transactions 2002 is a computationally expensive process. However, the problem of verifying many signatures is also parallel in nature. meaning that the computational work is easily divided and there is no dependency or need for communication between signature verifiers 1902. Because signature verification is so expensive computationally, high speed signature systems are preferred. A public example of a high speed key signature system is Ed25519, though there are suitable cryptographic key systems known in the art.

A signature verification process 2004 receives a transaction messages 2002 each including a signature and public key as an input. If the signature does not match the public key in the transaction message mathematically through the chosen signature cryptography scheme, the signature verification process 2004 handles the input as an error. If the signature is verified, the signature verification process 2004 handles the input as verified, and passes it along to the next step. Verified signed messages are passed to transaction batchers 1906.

Transaction batchers 1906 perform operations on batches of input before passing it to a block maker. Of note, batching operations 2006 are independent of variable signature verifiers 1904, thus the output of the signature verifiers 1906 are not dependent on one another. Examples of batching operation 2006 parameters include compressing transactions after every X transactions, or after every Y milliseconds have passed. A compressed group of transactions are passed on to a block maker 1908.

A block maker 1908 takes as input compressed batches of transactions with verified signatures. The block maker 1908 stores each input in a linked-list that represents the data of the current block being written. A block represents data written in a specific window of time. blocks must be written after the previous block, and before the subsequent block in a block chain.

In an illustrative example, a new block is created each second. The block maker 1908 uses a Key-Value Storage system, where the key is used to designate the block time window, and the value is the linked-list of compressed verified transaction data.

The block maker 1908 generates the Merkle Root of a block by running a cryptographic hash function on the data in the current block and the previous block's Merkle root. There is of course an exception to the block hashing for the first block posted on the append-only ledger. The first block cannot have a previous block's Merkle root because there is no previous block. In this case, an empty string can be used as the previous Merkle root, or any static value can also be used.

In order to accommodate a high transaction rate, ledger transactions are recorded using volatile, high speed, memory, such as RAM. Data persistence is achieved by flushing the in-memory working set of data to a permanent storage device periodically. To achieve these operations, "fsync" type methods can perform this operation once per second.

Figure 21:
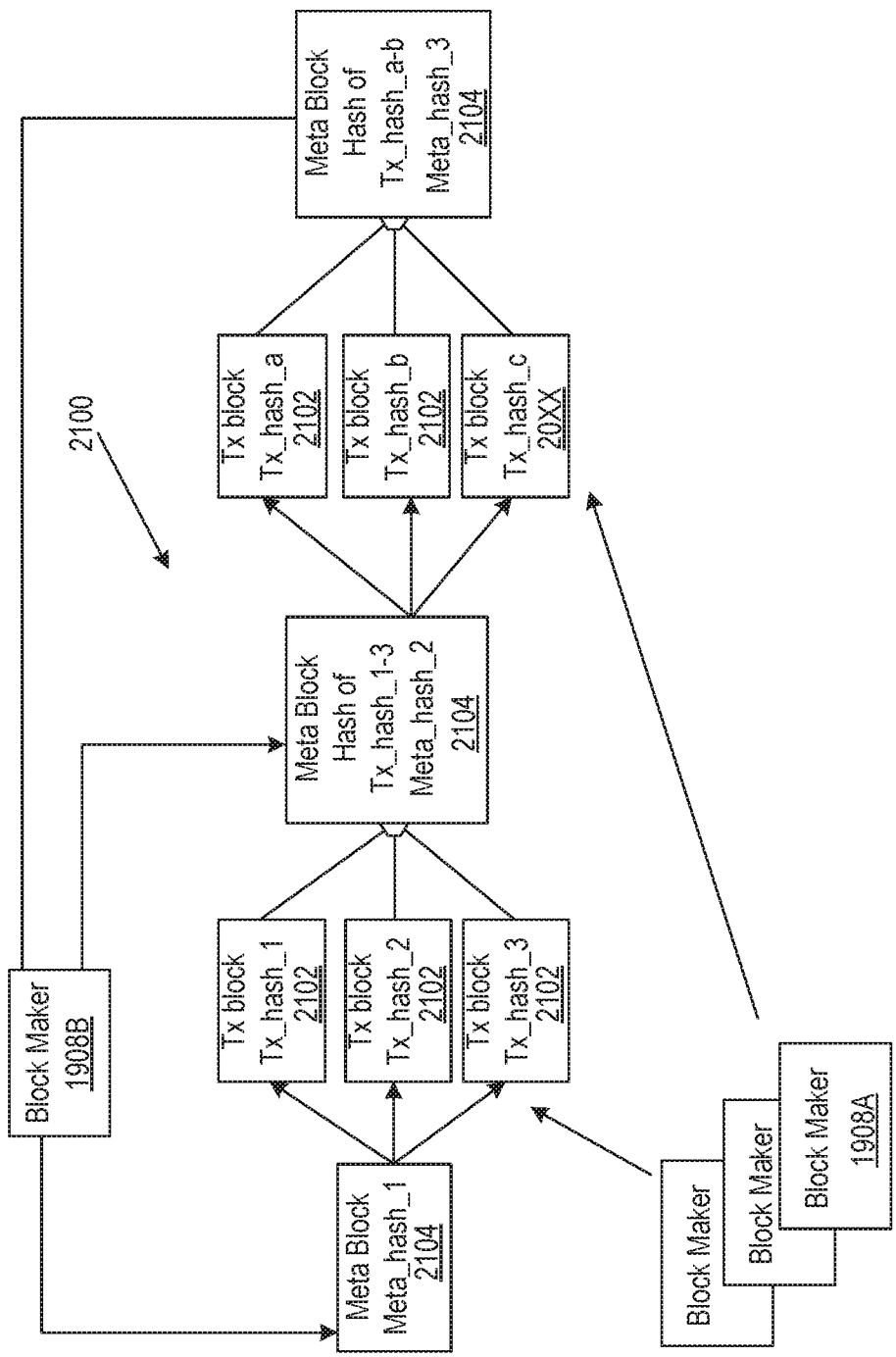
FIG. 21 is a block diagram of distributing additions to the append-only ledger.

FIG. 21 is a block diagram of distributing additions to the append-only ledger. In the displayed example, there are a plurality of block makers 1908 as well as the data structure 2100 for the append-only ledger. As a result that block makers 1908 process a hash function on a set of data including the hash of the previous block, block creation is difficult computational work to parallelize. As discussed above, data consistency over a large network is time intensive, and using a structure which plans eventual consistency of the data is more scalable.

In order to scale, the ledger data structure 2100 shards the total of incoming transactions into many blocks 2102. After transactions are sharded into blocks, a single, metadata block 2104 is created from just the hash of the transaction blocks. Because much less data is contained in the metadata block 2194, generation is faster than for the transaction blocks 2102.

In operation the block makers 1908 are split into 2 groups, those block makers 1908A generating transaction blocks 2102 and the relatively few block makers 1908B generating metadata blocks 2104. While the figure displays a 3 to 1 ratio, this is merely illustrative and the actual ratio depends on the hardware performance. In an arbitrary example, if the block makers 1908A process 1000 batched transactions a second, each including the Merkle root of the data for 1000 transactions and the hash of the previous block. Then the block maker 1908B obtains the Merkle root for the most recent set of transaction blocks 2102 in order to generate the metadata block 2104.

In a more specific illustrative example, a first metablock at an arbitrary point in the ledger has a hash value of "meta_hash_1." The plurality of transactions processed in the following second are processed by three block makers 1908A and have the Merkle root of the transaction data combined with meta_hash_1. The respective has values here are Tx_hash_1, Tx_hash_2, and Tx_hash_3.

After, the meta block maker 1908B generates a metadata block 2104 which includes the Merkle root of the 3 transaction block 2102 hashes (Tx_hash_1, Tx_hash_2, and Tx_hash_3). The new value is Meta_hash_2. Because there is significantly less data to be hashed in the creation of the metadata block 2104, this block is created significantly faster and additional time may elapse to allow for the block makers 1908A to complete each's respective transaction processing work. In this way distributed work dependency is limited to a single, or relatively few meta block makers 1908B, which is expected to complete work faster than the transaction block makers 1908A.

In the subsequent round of transactions, the three block makers 1908A generate the Merkle root of the second round of transaction data combined with meta_hash_2. The respective has values here are Tx_hash_a, Tx_hash_b, and Tx_hash_c. Those hash values are then used to generate Meta_hash_3.

In some embodiments, there are a number of append-only ledgers which are organized in tiers wherein each tier receives a certain percentage of the incoming transaction data where the highest tier receives all the transaction data and the lowest tier receives the smallest percentage of the incoming transaction data.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method for gross settlement of validated and executed trades of equities in real-time, comprising:
   generating a first clearing instruction representing a first order for equities to be executed by an exchange, the first clearing instruction being cryptographically-signed with a first cryptographic signature;
   generating a first trade report for the first clearing instruction, the first trade report summarizing the first order for equities;
   generating, by a processor, a first data block including the first clearing instruction and the first trade report;
   appending the first data block to a first blockchain representing a primary ledger at a first level of a hierarchy of ledgers;
   determining that the first data block is relevant to a second blockchain representing a secondary ledger at a second level of the hierarchy of ledgers, the first level of the hierarchy of ledgers corresponding to more data blocks than the second level of the hierarchy of ledgers;
   appending the first data block to the second blockchain representing the secondary ledger based on the determination that the first data block is relevant to the second blockchain;
   determining that the first cryptographic signature of the first clearing instruction of the first data block is valid; and
   selecting a fast track settlement process to process the first order for equities based on the determination that the first cryptographic signature is valid, the fast track settlement process processing the first order for equities faster than a traditional settlement process that is used in response to the first cryptographic signature being determined to be invalid; and
   upon determining that the first cryptographic signature is valid using the processor, preventing a double spending problem by:
      creating a timestamp associated with the first data block without performing a proof of work computation, the timestamp indicating a priority of a transaction associated with the first data block;

determining whether at least two transactions are simultaneous;

upon determining that the at least two transactions are simultaneous, checking whether an attempt to create the double spending problem occurred; and upon determining that the attempt to create the double spending problem occurred, reversing at least one of the at least two transactions.

2. The method of claim 1, wherein a first cryptographic key is based on one or both of private or public cryptographic keys.

3. The method of claim 1, wherein determining that the first data block is relevant to the second blockchain includes determining that one or both of the first clearing instruction or the first trade report references the secondary ledger at the second level of the hierarchy of ledgers.

4. The method of claim 1, wherein the first level of the hierarchy of ledgers includes fewer ledgers than the second level of the hierarchy of ledgers.

5. The method of claim 1, further comprising:
generating a second clearing instruction representing a second order for equities to be executed by the exchange, the second clearing instruction being cryptographically-signed with a second cryptographic signature;
generating a second trade report for the second clearing instruction, the second trade report summarizing the second order for equities;
generating a second data block including the second clearing instruction and the second trade report;
appending the second data block to the first blockchain;
determining that the second data block is relevant to the second blockchain;
appending the second data block to the second blockchain based on the determination that the second data block is relevant to the second blockchain;
determining that the second cryptographic signature of the second clearing instruction of the first data block is invalid; and
selecting the traditional settlement process rather than the fast track settlement process based on the determination that the second cryptographic signature is invalid.

6. A method, comprising:
receiving a first clearing instruction representing a first order for equities, the first clearing instruction having a first cryptographic signature;
generating, by a processor, a first data block including the first order for equities and the first cryptographic signature in a first blockchain, wherein generating the first data block includes appending the first data block to an end of the first blockchain;
determining that the first cryptographic signature is valid;
selecting a fast track settlement process to process the first order included in the first data block based on the determination that the first cryptographic signature is valid, the fast track settlement process processing the first order for equities faster than a traditional settlement process that is used in response to the first cryptographic signature being determined to be invalid;
upon determining that the first cryptographic signature is valid using the processor, preventing a double spending problem by:
creating a timestamp associated with the first data block without performing a proof of work computation, the timestamp indicating a priority of a transaction associated with the first data block;

determining whether at least two transactions are simultaneous;

upon determining that the at least two transactions are simultaneous, checking whether an attempt to create the double spending problem occurred; and upon determining that the attempt to create the double spending problem occurred, reversing at least one of the at least two transactions.

7. The method of claim 6, wherein the first blockchain represents a primary ledger at a first level of a hierarchy of ledgers, the method further comprising:
determining that the first data block is relevant to a second blockchain representing a secondary ledger at a second level of the hierarchy of ledgers, the first level and the second level being different; and
appending the first data block to the second blockchain representing the secondary ledger based on the determination that the first data block is relevant to the second blockchain.

8. The method of claim 7, wherein determining that the first data block is relevant to the second blockchain includes determining that the first clearing instruction references the secondary ledger at the second level of the hierarchy of ledgers.

9. The method of claim 7, wherein ledgers at the first level of the hierarchy of ledgers include more data blocks than ledgers at the second level of the hierarchy of ledgers.

10. The method of claim 7, wherein the first level of the hierarchy of ledgers includes fewer ledgers than the second level of the hierarchy of ledgers.

11. The method of claim 6, wherein the first cryptographic signature is based on one or both of private or public cryptographic keys.

12. An electronic device, comprising:
one or more processors; and
memory storing instructions, wherein the one or more processors are configured to execute the instructions such that the one or more processors and memory are configured to:
receive a first clearing instruction representing a first order for equities, the first clearing instruction having a first cryptographic signature;
generate a first data block including the first order for equities and the first cryptographic signature in a first blockchain, wherein generating the first data block includes appending the first data block to an end of the first blockchain;
determine that the first cryptographic signature is valid;
select a fast track settlement process to process the first order included in the first data block based on the determination that the first cryptographic signature is valid, the fast track settlement process processing the first order for equities faster than a traditional settlement process that is used in response to the first cryptographic signature being determined to be invalid;
prevent a double spending problem by:
creating a timestamp associated with the first data block without performing a proof of work computation, the timestamp indicating a priority of a transaction associated with the first data block;

determining whether at least two transactions are simultaneous;

upon determining that the at least two transactions are simultaneous, checking whether an attempt to create the double spending problem occurred; and upon determining that the attempt to create the double spending problem occurred, reversing at least one of the at least two transactions.

13. The electronic device of claim 12, wherein the first blockchain represents a primary ledger at a first level of a hierarchy of ledgers, and the one or more processors are configured to execute the instructions such that the one or more processors and memory are configured to:
determine that the first data block is relevant to a second blockchain representing a secondary ledger at a second level of the hierarchy of ledgers, the first level and the second level being different; and
append the first data block to the second blockchain representing the secondary ledger based on the determination that the first data block is relevant to the second blockchain.

14. The electronic device of claim 13, wherein ledgers at the first level of the hierarchy of ledgers include more data blocks than ledgers at the second level of the hierarchy of ledgers.

15. The electronic device of claim 13, wherein the first level of the hierarchy of ledgers includes fewer ledgers than the second level of the hierarchy of ledgers.

16. The electronic device of claim 12, wherein the first cryptographic signature is based on one or both of private or public cryptographic keys.

17. A method, comprising:
generating a clearing instruction representing an order for equities, the clearing instruction being cryptographically-signed with a cryptographic signature;
generating, by a processor, a data block including the clearing instruction as an appended data block to a first blockchain representing a primary ledger at a first level of a hierarchy of ledgers;
determining that the data block is relevant to a second blockchain representing a secondary ledger at a second level of the hierarchy of ledgers, the first level of the hierarchy of ledgers corresponding to more data blocks than the second level of the hierarchy of ledgers;
appending the data block to the second blockchain representing the secondary ledger based on the determination that the data block is relevant to the second blockchain;
determining that the cryptographic signature of the clearing instruction of the data block is valid;
selecting a fast track settlement process for the order for equities based on the determination that the cryptographic signature is valid, the fast track settlement process settling the order for equities faster than a traditional settlement process that is used in response to the cryptographic signature being determined to be invalid;
preventing a double spending problem by:
creating a timestamp associated with the data block without performing a proof of work computation, the timestamp indicating a priority of a transaction associated with the data block;
determining whether at least two transactions are simultaneous;
upon determining that the at least two transactions are simultaneous, checking whether an attempt to create the double spending problem occurred; and
upon determining that the attempt to create the double spending problem occurred, reversing at least one of the at least two transactions.

18. An electronic device, comprising:
one or more processors; and
memory storing instructions, wherein the one or more processors are configured to execute the instructions such that the one or more processors and memory are configured to:
generate a clearing instruction representing an order for equities, the clearing instruction being cryptographically-signed with a cryptographic signature;
generate a data block including the clearing instruction as an appended data block to a first blockchain representing a primary ledger at a first level of a hierarchy of ledgers;
determine that the data block is relevant to a second blockchain representing a secondary ledger at a second level of the hierarchy of ledgers, the first level of the hierarchy of ledgers corresponding to more data blocks than the second level of the hierarchy of ledgers;
append the data block to the second blockchain representing the secondary ledger based on the determination that the data block is relevant to the second blockchain;
determine that the cryptographic signature of the clearing instruction of the data block is valid;
select a fast track settlement process for the order for equities based on the determination that the cryptographic signature is valid, the fast track settlement process settling the order for equities faster than a traditional settlement process that is used in response to the cryptographic signature being determined to be invalid;
prevent a double spending problem by:
creating a timestamp associated with the data block without performing a proof of work computation, the timestamp indicating a priority of a transaction associated with the data block;
determining whether at least two transactions are simultaneous;
upon determining that the at least two transactions are simultaneous, checking whether an attempt to create the double spending problem occurred; and
upon determining that the attempt to create the double spending problem occurred, reversing at least one of the at least two transactions.

* * * * *